(12) United States Patent
Xu et al.

(10) Patent No.: US 12,522,600 B2
(45) Date of Patent: Jan. 13, 2026

(54) CRYSTAL FORM AND SALT FORM OF BROMINE DOMAIN PROTEIN INHIBITOR AND PREPARATION METHOD THEREFOR

(71) Applicants: CHIA TAI TIANQING PHARMACEUTICAL GROUP CO., LTD., Lianyungang (CN); SHOUYAO HOLDINGS (BEIJING) CO., LTD., Beijing (CN)

(72) Inventors: Wenwei Xu, Nanjing (CN); Zhenliang Shan, Nanjing (CN); Yingya Zhang, Nanjing (CN); Guoliang Zhang, Nanjing (CN); Yun Ge, Nanjing (CN); Aiming Zhang, Nanjing (CN); Xiquan Zhang, Nanjing (CN)

(73) Assignees: CHIA TAI TIANQING PHARMACEUTICAL GROUP CO., LTD., Lianyungang (CN); SHOUYAO HOLDINGS (BEIJING) CO., LTD., Beijing (CN)

( * ) Notice: Subject to any disclaimer, the term of this patent is extended or adjusted under 35 U.S.C. 154(b) by 730 days.

(21) Appl. No.: 17/793,588

(22) PCT Filed: Jan. 19, 2021

(86) PCT No.: PCT/CN2021/072651
§ 371 (c)(1),
(2) Date: Jul. 18, 2022

(87) PCT Pub. No.: WO2021/143922
PCT Pub. Date: Jul. 22, 2021

(65) Prior Publication Data
US 2024/0101551 A1 Mar. 28, 2024

(30) Foreign Application Priority Data

Jan. 19, 2020 (CN) .......................... 202010057297.0
Jan. 19, 2020 (CN) .......................... 202010060110.2

(51) Int. Cl.
*C07D 471/04* (2006.01)
*A61P 35/02* (2006.01)

(52) U.S. Cl.
CPC ............ *C07D 471/04* (2013.01); *A61P 35/02* (2018.01); *C07B 2200/13* (2013.01)

(58) Field of Classification Search
CPC ................................................. C07D 471/04
USPC ........................................................ 514/300
See application file for complete search history.

(56) References Cited

U.S. PATENT DOCUMENTS

2014/0162971 A1 6/2014 Wang et al.
2015/0005340 A1 1/2015 Gong

FOREIGN PATENT DOCUMENTS

| CN | 105473586 A | 4/2016 |
| CN | 110577526 A | 12/2019 |
| WO | 2013097052 A1 | 7/2013 |
| WO | 2018130174 A1 | 7/2018 |
| WO | 2020020288 A1 | 1/2020 |

OTHER PUBLICATIONS

McDaniel et al. " Discovery of N-(4-(2,4-Difluorophenoxy)-3-(6-methyl-7-oxo-6,7-dihydro-1H-pyrrolo[2,3-c]pyridin-4-yl)phenyl)ethanesulfonamide (ABBV-075/Mivebresib), a Potent and Orally Available Bromodomain and Extraterminal Domain (BET) Family Bromodomain Inhibitor" J. Med. Chem. 2017, 60, 8369-8384; Sep. 26, 2017.
Lori et al. "Effect of BET Missense Mutations on Bromodomain Function, Inhibitor Binding and Stability" PLOS One | DOI:10.1371/journal.pone.0159180 Jul. 12, 2016.

*Primary Examiner* — Taofiq A Solola
(74) *Attorney, Agent, or Firm* — Maschoff Brennan

(57) ABSTRACT

A crystal form and salt form of a bromine domain protein inhibitor represented by formula (I), a preparation method therefor, and a use of the crystal form and salt form in the preparation of a drug for treating diseases mediated by BET protein.

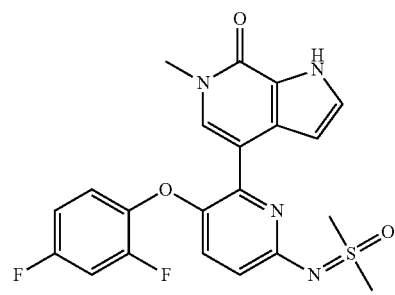

(I)

20 Claims, 8 Drawing Sheets

CRYSTAL FORM AND SALT FORM OF BROMINE DOMAIN PROTEIN INHIBITOR AND PREPARATION METHOD THEREFOR

CROSS-REFERENCE TO RELATED APPLICATIONS

The present application claims priority to and benefit of the Chinese Patent Application No. 202010057297.0 filed with China National Intellectual Property Administration on Jan. 19, 2020 and the Chinese Patent Application No. 202010060110.2 filed with China National Intellectual Property Administration on Jan. 19, 2020, the disclosure of each of which is incorporated herein by reference in its entirety.

TECHNICAL FIELD

The present application relates to the field of pharmaceutical chemistry, and particularly relates to a crystal form of a bromodomain-containing protein inhibitor, a preparation method therefor, a crystalline composition comprising the crystal form, a pharmaceutical composition comprising the crystal form or the crystalline composition, and use thereof. The present application also relates to hydrochloride, sulfate, phosphate and mesylate salts of the bromodomain-containing protein inhibitor, crystal forms thereof, preparation methods therefor, pharmaceutical compositions comprising the salts, and uses thereof.

BACKGROUND

The epigenetic regulation of transcriptional genes plays an important role in the development of diseases such as tumors, inflammations, and metabolic diseases. Acetylation of the N-terminal residue of the nucleosomal histone lysine is especially important for the regulation of genetic epigenomes. Histone acetylation is usually most associated with the activation of gene transcription, and recognition of histone lysine acetylation is a key step in the involvement of the histone acetylation in epigenetic regulation. Bromodomains (BRDs) are a class of conserved protein domains capable of specifically recognizing acetylated lysine (KAc) in histones, and contribute to the enrichment of chromatin-remodeling factors, transcription factors and other related proteins at specific gene transcription sites by binding to acetylated lysine, to change the activity of RNA II polymerase, thereby synergistically regulating the gene expression.

Bromodomain and extra terminal (BET) protein comprises two interrelated bromodomain centers and an extra-terminal domain, and is divided into four proteins, Brd2, Brd3, Brd4 and BrdT, according to the difference in amino acid sequences, among which Brd2, Brd3 and Brd4 are widely distributed in various organs of a human body. BET is a class of transcriptional regulatory proteins that play a very important role in the regulation of gene expression through interaction with chromatin. BET proteins have a bidirectional regulatory function of co-activation or co-inhibition of the cellular signaling pathway network, such as transcription of insulin, adipogenesis in lipid tissue, and differentiation of the hematopoietic system. In recent years, studies have demonstrated that BET protein-targeted drugs can be used to treat cancer, inflammation, kidney disease and autoimmune diseases, combat male fertility, and so on. Therefore, BET proteins have increasingly become one of the important targets in the field of epigenetics, and have attracted great attention from various pharmaceutical companies and scientific research institutes.

SUMMARY

In one aspect, the present application provides a crystal form of a compound of formula (I) or a pharmaceutically acceptable salt thereof:

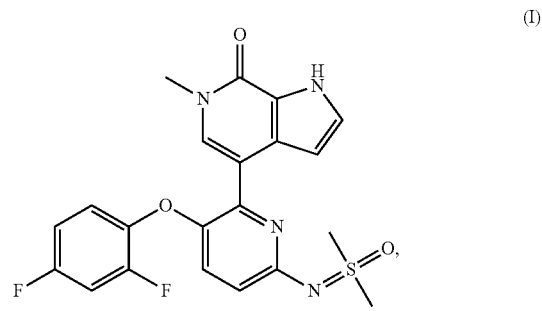 [SMILES: Cn1cc(-c2nc(N=S(C)(C)=O)ccc2Oc2ccc(F)cc2F)c2cc[nH]c2c1=O]

wherein the crystal form is selected from the group consisting of:

a crystal form I of the compound of formula (I), wherein the crystal form I has characteristic diffraction peaks at the following 2θ: 12.4°±0.2°, 14.5°±0.2°, 17.4°±0.2°, 18.5°±0.2°, 20.4°±0.2°, and 24.7°±0.2°, in an X-ray powder diffraction pattern;

a crystal form A of a hydrochloride salt of the compound of formula (I), wherein the crystal form A has characteristic diffraction peaks at the following 2θ: 6.8°±0.2°, 8.4°±0.2°, 9.4°±0.2°, 10.2°±0.2°, and 16.8°±0.2°, in an X-ray powder diffraction pattern;

a crystal form B of a hydrochloride salt of the compound of formula (I), wherein the crystal form B has characteristic diffraction peaks at the following 2θ: 8.7°±0.2°, 9.5°±0.2°, 10.5°±0.2°, 14.5°±0.2°, and 17.4°±0.2°, in an X-ray powder diffraction pattern;

a crystal form C of a hydrochloride salt of the compound of formula (I), wherein the crystal form C has characteristic diffraction peaks at the following 2θ: 6.8°±0.2°, 9.5°±0.2°, 12.9°±0.2°, 20.5°±0.2°, and 24.6°±0.2°, in an X-ray powder diffraction pattern;

a crystal form D of a sulfate salt of the compound of formula (I), wherein the crystal form D has characteristic diffraction peaks at the following 2θ: 13.5°±0.2°, 14.7°±0.2°, 18.6°±0.2°, 21.2°±0.2°, 23.0°±0.2°, and 24.1°±0.2°, in an X-ray powder diffraction pattern;

a crystal form E of a phosphate salt of the compound of formula (I), wherein the crystal form E has characteristic diffraction peaks at the following 2θ: 10.1°±0.2°, 10.5°±0.2°, 19.0°±0.2°, 21.0°±0.2°, 22.7°±0.2°, and 24.0°±0.2°, in an X-ray powder diffraction pattern; and a crystal form F of a mesylate salt of the compound of formula (I), wherein the crystal form F has characteristic diffraction peaks at the following 2θ: 8.8°±0.2°, 10.1°±0.2°, 17.7°±0.2°, 18.0°±0.2°, 24.1°±0.2°, and 24.8°±0.2°, in an X-ray powder diffraction pattern.

In another aspect, the present application provides a crystal form I of the compound of formula (I):

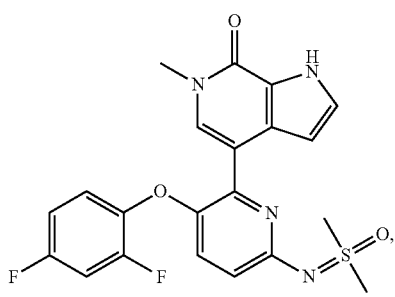

(I)

wherein the crystal form I has characteristic diffraction peaks at 2θ of 12.4°±0.2°, 14.5°±0.2°, 17.4°±0.2°, 18.5°±0.2°, 20.4°±0.2°, and 24.7°±0.2° in an X-ray powder diffraction (XRPD) pattern.

In some embodiments, the crystal form I has characteristic diffraction peaks at 2θ of 6.6°±0.2°, 9.3°±0.2°, 12.4°±0.2°, 14.5°±0.2°, 16.6°±0.2°, 17.4°±0.2°, 18.5°±0.2°, 20.0°±0.2°, 20.4°±0.2°, and 24.7°±0.2° in an X-ray powder diffraction (XRPD) pattern.

In some embodiments, the crystal form I has characteristic diffraction peaks at 2θ of 6.6°±0.2°, 9.3°±0.2°, 12.4°±0.2°, 14.5°±0.2°, 16.6°±0.2°, 17.4°±0.2°, 18.5°±0.2°, 20.0°±0.2°, 20.4°±0.2°, 21.5°±0.2°, 22.5°±0.2°, 23.7°±0.2°, 24.7°±0.2°, and 25.2°±0.2° in an X-ray powder diffraction (XRPD) pattern.

In some embodiments, the crystal form I has characteristic diffraction peaks in an X-ray powder diffraction (XRPD) pattern with positions and relative intensities shown in Table 1:

TABLE 1

Positions and relative intensities of characteristic diffraction peaks in the X-ray powder diffraction pattern of the crystal form I

| No. | 2θ (±0.2°) | Relative intensity (%) |
|---|---|---|
| 1 | 6.6 | 20.0 |
| 2 | 9.3 | 16.2 |
| 3 | 12.4 | 63.4 |
| 4 | 14.5 | 100.0 |
| 5 | 14.7 | 27.5 |
| 6 | 15.2 | 10.2 |
| 7 | 16.6 | 21.1 |
| 8 | 17.4 | 32.4 |
| 9 | 18.5 | 99.2 |
| 10 | 20.0 | 25.3 |
| 11 | 20.4 | 45.0 |
| 12 | 21.5 | 20.9 |
| 13 | 21.8 | 8.1 |
| 14 | 22.5 | 21.8 |
| 15 | 23.3 | 8.0 |
| 16 | 23.7 | 26.4 |
| 17 | 24.7 | 36.7 |
| 18 | 25.2 | 26.9 |
| 19 | 26.9 | 11.1 |
| 20 | 29.3 | 15.5 |
| 21 | 29.7 | 14.8 |
| 22 | 30.3 | 12.5 |

In some embodiments, the crystal form I has an X-ray powder diffraction (XRPD) pattern with characteristics represented by the XRPD pattern shown in FIG. 1.

In some embodiments, the crystal form I has a differential scanning calorimetry (DSC) pattern with characteristics represented by the DSC pattern shown in FIG. 2.

In some embodiments, the crystal form I has an endothermic peak at 275±3° C. in a DSC pattern.

In some embodiments, the crystal form I is prepared in a solvent selected from the group consisting of one of or a mixed solvent of one or more of water, acetonitrile, methanol, ethanol, isopropanol, ethyl acetate, acetone, dimethyl sulfoxide, and dichloromethane. In some embodiments, the crystal form I is prepared in a solvent selected from the group consisting of one of or a mixed solvent of one or more of water, methanol, dimethyl sulfoxide, dichloromethane and acetonitrile. In some embodiments, the crystal form I is prepared in dimethyl sulfoxide, methanol, or water. In some embodiments, the crystal form I is prepared in a mixed solvent of dimethyl sulfoxide and water, a mixed solvent of dimethyl sulfoxide and methanol, a mixed solvent of dichloromethane and methanol, or a mixed solvent of acetonitrile and water.

In some embodiments, the crystal form I has a particle size distribution $X_{90}$ of less than 30 μm. In some embodiments, the crystal form I has a particle size distribution $X_{90}$ of less than 20 μm. In some embodiments, the crystal form I has a particle size distribution $X_{90}$ of less than 15 μm. In some embodiments, the crystal form I has a particle size distribution $X_{90}$ of less than 12 μm. In some embodiments, the crystal form I has a particle size distribution $X_{90}$ of less than 10 μm. In some embodiments, the crystal form I has a particle size distribution $X_{90}$ of less than 7 μm.

In some embodiments, the crystal form I has a particle size distribution $X_{90}$ of 3.0-14.0 μm, preferably 3.5-13.5 μm, more preferably 4.0-13.0 μm, further preferably 4.5-12.5 μm, and further more preferably 5.0-12.0 μm. In some embodiments, the crystal form I has a particle size distribution $X_{90}$ of 3.5-8.5 μm, preferably 4.5-7.5 μm, and more preferably 5.5-6.5 μm.

In some embodiments, the crystal form I has a particle size distribution $X_{90}$ of 9.5-13.5 μm, preferably 10.5-12.5 μm, and more preferably 11.0-12.0 μm.

In some embodiments, the particle size distribution $X_{90}$ of the crystal form I is determined after jet milling of the crystal form I. In some embodiments, the jet milling has a milling pressure selected from 0.1-0.7 MPa, preferably 0.1-0.6 MPa; or the jet milling has a milling pressure selected from the group consisting of 0.1 MPa, 0.2 MPa, 0.3 MPa, 0.4 MPa, 0.5 MPa, 0.6 MPa, 0.7 MPa and a range formed by any of the above values.

The present application also provides a preparation method for the crystal form I of the compound of formula (I), comprising:

(1) mixing the compound of formula (I) with a solvent I; and (2) performing filtering and drying processes;

wherein preferably, the solvent I is selected from one of or a mixed solvent of one or more of water, acetonitrile, methanol, ethanol, isopropanol, ethyl acetate, acetone, dimethyl sulfoxide and dichloromethane, preferably selected from one of or a mixed solvent of one or more of water, acetonitrile, methanol, dimethyl sulfoxide and dichloromethane, more preferably selected from the group consisting of water and dimethyl sulfoxide, and further preferably selected from a mixed solvent of dichloromethane and methanol.

In some embodiments, the preparation method for the crystal form I of the compound of formula (I) comprises:

(1) mixing the compound of formula (I) with a solvent I;
(2) mixing the mixture of the step (1) with a solvent II; and
(3) performing filtering and drying processes;

wherein preferably, the solvent I and the solvent II are each independently selected from the group consisting of water, acetonitrile, methanol, ethanol, isopropanol, ethyl acetate, acetone, dimethyl sulfoxide and dichloromethane, preferably selected from the group consisting of water, acetonitrile, methanol, dimethyl sulfoxide and dichloromethane, more preferably selected from the group consisting of water, methanol and dimethyl sulfoxide, and further preferably selected from dichloromethane and methanol.

In some embodiments, in the step (2), the mixture of the step (1) is mixed with a solvent II in a manner including, but not limited to: a. adding the mixture of the step (1) to a solvent II; b. adding a solvent II to the mixture of the step (1). In some embodiments, the manner is preferably dropwise addition.

In some embodiments, the step (2) is adding the mixture of the step (1) to a solvent II dropwise at an appropriate temperature. In some embodiments, the appropriate temperature is −10-30° C. In some embodiments, the appropriate temperature is −5-10° C. In some embodiments, the appropriate temperature is 0° C.

The present application also provides a preparation method for the crystal form I of the compound of formula (I), comprising:
(1) mixing a pharmaceutically acceptable salt of the compound of formula (I) with a solvent III; and
(2) performing filtering and drying processes;
wherein the solvent III is preferably selected from one of or a mixed solvent of one or more of water, acetonitrile, methanol, ethanol, isopropanol, ethyl acetate and acetone, preferably selected from one of or a mixed solvent of one or more of water, acetonitrile and methanol, and more preferably selected from the group consisting of water, an acetonitrile/water mixed solvent, and a methanol/water mixed solvent.

In some embodiments, in the step (1), the pharmaceutically acceptable salt of the compound of formula (I) is mixed with solvent III, and the mixture is stirred for a period of time, preferably 3-4 h. In some embodiments, the mixture is stirred at room temperature.

In some embodiments, the preparation method for the crystal form I of the compound of formula (I) comprises:
(1) mixing a pharmaceutically acceptable salt of the compound of formula (I) with a solvent III;
(2) mixing the mixture of the step (1) with a solvent IV; and
(3) performing filtering and drying processes;
wherein preferably, the solvent III and the solvent IV are each independently selected from the group consisting of water, acetonitrile, methanol, ethanol, isopropanol, ethyl acetate and acetone, preferably selected from the group consisting of water, acetonitrile, methanol, ethanol and isopropanol, and more preferably selected from the group consisting of water, acetonitrile and methanol.

In some embodiments, in the step (2), the mixture of the step (1) is mixed with a solvent IV in a manner including, but not limited to: a. adding the mixture of the step (1) to a solvent IV; b. adding a solvent IV to the mixture of the step (1). In some embodiments, the manner is preferably dropwise addition.

In some embodiments, in the step (2), the mixture of step (1) is mixed with a solvent IV, and the mixture is crystallized. In some embodiments, the mixture is crystallized at room temperature.

In some embodiments, the pharmaceutically acceptable salt of the compound of formula (I) is selected from a hydrochloride salt of the compound of formula (I). In some embodiments, the hydrochloride salt of the compound of formula (I) is selected from the group consisting of a crystal form A, a crystal form B, and a crystal form C, preferably a crystal form A.

The present application also provides a pharmaceutically acceptable salt (salt form) of the compound of formula (I), wherein the pharmaceutically acceptable salt is selected from the group consisting of a hydrochloride salt of the compound of formula (I), a sulfate salt of the compound of formula (I), a phosphate salt of the compound of formula (I), and a mesylate salt of the compound of formula (I).

In yet another aspect, the present application provides a hydrochloride salt of the compound of formula (I):

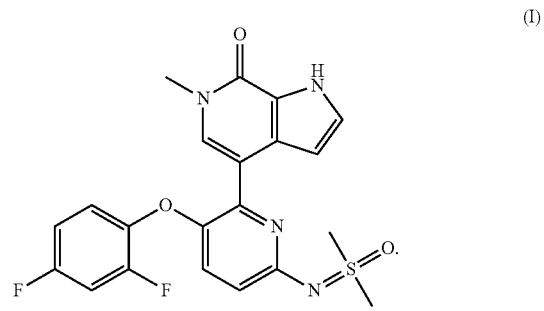 [SMILES: Cn1cc(-c2nc(N=S(C)(C)=O)ccc2Oc2ccc(F)cc2F)c2cc[nH]c2c1=O]

(I)

The present application also provides a crystal form of the hydrochloride salt of the compound of formula (I), a preparation method therefor and a corresponding crystalline composition thereof.

In some embodiments, the hydrochloride salt of the compound of formula (I) is a salt formed with the compound of formula (I) and hydrochloric acid in a molar ratio of 1:1.

In some embodiments, the hydrochloride salt of the compound of formula (I) has a hydrochloric acid content of 5-10 wt %, preferably 6-9 wt % and 6-8 wt %; or the hydrochloride salt of the compound of formula (I) has a hydrochloric acid content selected from the group consisting of 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt % and a range formed by any of the above values.

In some embodiments, the crystal form of the hydrochloride salt of the compound of formula (I) is a hydrate selected from the group consisting of a hemihydrate, a monohydrate, a dihydrate, a trihydrate and a tetrahydrate, preferably a monohydrate, a dihydrate and a tetrahydrate, more preferably a monohydrate and a tetrahydrate.

In some embodiments, the crystal form of the hydrochloride salt of the compound of formula (I) is a monohydrate.

In some embodiments, the crystal form of the hydrochloride salt of the compound of formula (I) is a tetrahydrate.

The present application provides a crystal form A of the hydrochloride salt of the compound of formula (I), wherein the crystal form A has diffraction peaks at 2θ of 6.8°±0.2°, 8.4°±0.2°, 9.4°±0.2°, 10.2°±0.2°, and 16.8°±0.2° in an X-ray powder diffraction (XRPD) pattern.

In some embodiments, the crystal form A has diffraction peaks at 2θ of 6.8°±0.2°, 8.4°±0.2°, 9.4°±0.2°, 10.2°±0.2°, 14.4°±0.2°, 16.8°±0.2°, 20.5°±0.2°, and 24.7°±0.2° in an X-ray powder diffraction (XRPD) pattern.

In some embodiments, the crystal form A has diffraction peaks at 2θ of 6.8°±0.2°, 8.4°±0.2°, 9.4°±0.2°, 10.2°±0.2°, 14.4°±0.2°, 16.8°±0.2°, 19.2°±0.2°, 20.5°±0.2°, 21.7°±0.2°, 23.3°±0.2°, and 24.7°±0.2° in an X-ray powder diffraction (XRPD) pattern.

In some embodiments, the crystal form A has characteristic diffraction peaks in an X-ray powder diffraction (XRPD) pattern with positions and relative intensities shown in Table 2:

TABLE 2

Positions and relative intensities of characteristic diffraction peaks in the X-ray powder diffraction pattern of the crystal form A

| No. | 2θ (±0.2°) | Relative intensity (%) |
|---|---|---|
| 1 | 6.8 | 45.2 |
| 2 | 8.4 | 100.0 |
| 3 | 9.4 | 13.6 |
| 4 | 10.2 | 21.5 |
| 5 | 14.4 | 5.4 |
| 6 | 16.8 | 33.5 |
| 7 | 19.2 | 4.8 |
| 8 | 20.5 | 10.6 |
| 9 | 21.7 | 4.2 |
| 10 | 23.3 | 3.5 |
| 11 | 24.7 | 7.0 |
| 12. | | |

In some embodiments, the crystal form A has an X-ray powder diffraction (XRPD) pattern with characteristics represented by the XRPD pattern shown in FIG. 3.

In some embodiments, the crystal form A has a differential scanning calorimetry (DSC) pattern with characteristics represented by the DSC pattern shown in FIG. 4.

In some embodiments, the crystal form A has an endothermic peak at 149.61±3° C. in a DSC pattern. In some embodiments, the crystal form A has an endothermic peak at 101.14±3° C. in a DSC pattern. In some embodiments, the crystal form A has an endothermic peak at 80.15±3° C. in a DSC pattern. In some embodiments, the crystal form A has an endothermic peak at 62.98±3° C. in a DSC pattern. In some embodiments, the crystal form A has endothermic peaks at 149.61±3° C., and/or 101.14±3° C., and/or 80.15±3° C., and/or 62.98±3° C. in a DSC pattern.

The %, when used in the present application for describing weight loss and water content, refers to wt %.

In some embodiments, the crystal form A has a thermogravimetric analysis (TGA) curve with characteristics represented by the TGA curve shown in FIG. 5.

In some embodiments, the crystal form A has a weight loss of 2.37%±0.2% at 119.1±3° C. in a thermogravimetric analysis curve.

In some embodiments, the crystal form A has a weight loss of 2.37%±0.2% at 119.1±3° C., and/or a weight loss of 16.78%±0.2% at 258.7±3° C., and/or a weight loss of 38.60%±0.2% at 494.1±3° C. in a thermogravimetric analysis.

In some embodiments, the crystal form A is prepared in a solvent selected from one of or a mixed solvent of one or more of methanol, ethanol, isopropanol, acetone, ethyl acetate and acetonitrile. In some embodiments, the crystal form A is prepared in a solvent selected from the group consisting of methanol, ethanol and isopropanol. In some embodiments, the crystal form A is prepared in methanol.

The present application also provides a preparation method for the crystal form A of the hydrochloride salt of the compound of formula (I), comprising the following steps:

(1) mixing the compound of formula (I) with a solvent A;
(2) adding hydrochloric acid to the mixture of the step (1); and
(3) performing filtering and drying processes;
wherein the solvent A is selected from one of or a mixed solvent of one or more of methanol, ethanol, isopropanol, acetone, ethyl acetate and acetonitrile, preferably selected from the group consisting of methanol, ethanol and isopropanol, and more preferably methanol.

In some embodiments, the crystal form A has a water content of 5.0%-9.0%, preferably 5.5%-8.5%, and more preferably 5.8%-8.1%. In some embodiments, the crystal form A has a water content of 4.7%. In some embodiments, the crystal form A has a water content of 5.8%. In some embodiments, the crystal form A has a water content of 6.6%. In some embodiments, the crystal form A has a water content of 8.1%.

The present application provides a crystal form B of the hydrochloride salt of the compound of formula (I), wherein the crystal form B has diffraction peaks at 2θ of 8.7°±0.2°, 9.5°±0.2°, 10.5°±0.2°, 14.5°±0.2°, and 17.4°±0.2° in an X-ray powder diffraction (XRPD) pattern.

In some embodiments, the crystal form B has diffraction peaks at 2θ of 6.8°±0.2°, 8.7°±0.2°, 9.5°±0.2°, 10.5°±0.2°, 14.5°±0.2°, 17.4°±0.2°, 21.0°±0.2°, and 22.2°±0.2° in an X-ray powder diffraction (XRPD) pattern.

In some embodiments, the crystal form B has diffraction peaks at 2θ of 6.8°±0.2°, 8.7°±0.2°, 9.5°±0.2°, 10.5°±0.2°, 14.5°±0.2°, 17.4°±0.2°, 18.8°±0.2°, 20.1°±0.2°, 21.0°±0.2°, 22.2°±0.2°, and 24.6°±0.2° in an X-ray powder diffraction (XRPD) pattern.

In some embodiments, the crystal form B has characteristic diffraction peaks in an X-ray powder diffraction (XRPD) pattern with positions and relative intensities shown in Table 3:

TABLE 3

Positions and relative intensities of characteristic diffraction peaks in the X-ray powder diffraction pattern of the crystal form B

| No. | 2θ (±0.2°) | Relative intensity (%) |
|---|---|---|
| 1 | 6.8 | 7.8 |
| 2 | 8.7 | 100.0 |
| 3 | 9.5 | 14.9 |
| 4 | 10.5 | 48.3 |
| 5 | 14.5 | 16.6 |
| 6 | 17.4 | 35.9 |
| 7 | 18.8 | 10.4 |
| 8 | 20.1 | 10.6 |
| 9 | 21.0 | 13.9 |
| 10 | 22.2 | 13.3 |
| 11 | 24.6 | 12.7 |
| 12. | | |

In some embodiments, the crystal form B has an X-ray powder diffraction (XRPD) pattern with characteristics represented by the XRPD pattern shown in FIG. 6.

In some embodiments, the crystal form B has a water content of 2.0%-5.5%, preferably 3.0%-5.0%, and more preferably 3.6%-4.6%. In some embodiments, the crystal form B has a water content of 3.6%. In some embodiments, the crystal form B has a water content of 4.6%.

In some embodiments, the crystal form B is prepared from the crystal form A at 60±2° C.

The present application also provides a preparation method for the crystal form B of the hydrochloride salt of the compound of formula (I), comprising standing the crystal form A at 60±2° C. for 30 days.

The present application provides a crystal form C of the hydrochloride salt of the compound of formula (I), wherein the crystal form C has diffraction peaks at 2θ of 6.8°±0.2°, 9.5°±0.2°, 12.9°±0.2°, 20.5°±0.2°, and 24.6°±0.2° in an X-ray powder diffraction (XRPD) pattern.

In some embodiments, the crystal form C has diffraction peaks at 2θ of 6.8°±0.2°, 9.5°±0.2°, 12.9°±0.2°, 14.8°±0.2°, 17.5°±0.2°, 20.5°±0.2°, 23.3°±0.2°, and 24.6°±0.2° in an X-ray powder diffraction (XRPD) pattern.

In some embodiments, the crystal form C has diffraction peaks at 2θ of 6.8°±0.2°, 9.5°±0.2°, 11.9°±0.2°, 12.9°±0.2°, 14.8°±0.2°, 15.8°±0.2°, 17.5°±0.2°, 20.5°±0.2°, 23.3°±0.2°, 24.6°±0.2°, and 28.7°±0.2° in an X-ray powder diffraction (XRPD) pattern.

In some embodiments, the crystal form C has characteristic diffraction peaks in an X-ray powder diffraction (XRPD) pattern with positions and relative intensities shown in Table 4:

TABLE 4

Positions and relative intensities of characteristic diffraction peaks in the X-ray powder diffraction pattern of the crystal form C

| No. | 2θ (±0.2°) | Relative intensity (%) |
| --- | --- | --- |
| 1 | 6.8 | 69.1 |
| 2 | 9.5 | 100.0 |
| 3 | 11.9 | 14.6 |
| 4 | 12.9 | 20.2 |
| 5 | 14.8 | 16.7 |
| 6 | 15.8 | 15.7 |
| 7 | 16.5 | 10.5 |
| 8 | 17.5 | 17.2 |
| 9 | 20.5 | 46.3 |
| 10 | 21.7 | 12.8 |
| 11 | 23.3 | 19.9 |
| 12 | 23.9 | 9.9 |
| 13 | 24.6 | 50.5 |
| 14 | 26.0 | 10.2 |
| 15 | 28.2 | 12.6 |
| 16 | 28.7 | 24.0. |

In some embodiments, the crystal form C has an X-ray powder diffraction (XRPD) pattern with characteristics represented by the XRPD pattern shown in FIG. 7.

In some embodiments, the crystal form C has a water content of 9.0%-14.0%, preferably 9.5%-13.5%, and more preferably 10.0%-13.0%. In some embodiments, the crystal form C has a water content of 11.9%. In some embodiments, the crystal form C has a water content of 12.2%. In some embodiments, the crystal form C has a water content of 13.0%.

In some embodiments, the crystal form C is prepared from the crystal form A at room temperature with a relative humidity of 92.5%±5%.

The present application also provides a preparation method for the crystal form C of the hydrochloride salt of the compound of formula (I), comprising storing the crystal form A at room temperature with a relative humidity of 92.5%+5% for 30 days.

In another aspect, the present application provides a sulfate salt of the compound of formula (I):

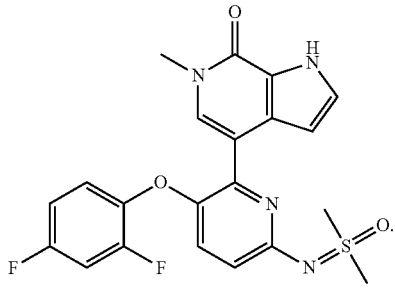

In some embodiments, the sulfate salt of the compound of formula (I) is shown in formula II

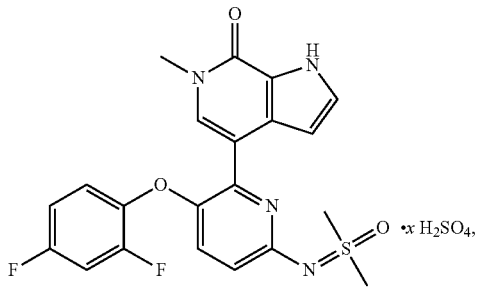

wherein x is selected from 0.5-1.

In some embodiments, the x is selected from the group consisting of 0.5 and 1.

In some embodiments, the x is selected from 1.

In some embodiments, the sulfate salt of the compound of formula (I) has a sulfuric acid content of 15-20 wt %, preferably 16-19 wt % and 17-19 wt %; or the sulfate salt of the compound of formula (I) has a sulfuric acid content selected from the group consisting of 16.1 wt %, 16.2 wt %, 16.3 wt %, 16.4 wt %, 16.5 wt %, 16.6 wt %, 16.7 wt %, 16.8 wt %, 16.9 wt %, 17.0 wt %, 17.1 wt %, 17.2 wt %, 17.3 wt %, 17.4 wt %, 17.5 wt %, 17.6 wt %, 17.7 wt %, 17.8 wt %, 17.9 wt %, 18.0 wt %, 18.1 wt %, 18.2 wt %, 18.3 wt %, 18.4 wt %, 18.5 wt %, 18.6 wt %, 18.7 wt %, 18.8 wt %, 18.9 wt %, 19.0 wt % and a range formed by any of the above values.

The present application also provides a crystal form D of the compound of formula II, wherein x is 1, and the crystal form D has characteristic diffraction peaks at 2θ of 13.5°±0.2°, 14.7°±0.2°, 18.6°±0.2°, 21.2°±0.2°, 23.0°±0.2°, and 24.1°±0.2° in an X-ray powder diffraction (XRPD) pattern.

In some embodiments, the crystal form D has characteristic diffraction peaks at 2θ of 7.1°±0.2°, 8.9°±0.2°, 9.8°±0.2°, 13.2°±0.2°, 13.5°±0.2°, 14.7°±0.2°, 18.6°±0.2°, 21.2°±0.2°, 23.0°±0.2°, and 24.1°±0.2° in an X-ray powder diffraction (XRPD) pattern.

In some embodiments, the crystal form D has characteristic diffraction peaks at 2θ of 7.1°±0.2°, 8.9°±0.2°, 9.8°±0.2°, 13.2°±0.2°, 13.5°±0.2°, 14.7°±0.2°, 16.3°±0.2°, 18.6°±0.2°, 19.7°±0.2°, 21.2°±0.2°, 21.9°±0.2°, 23.0°±0.2°, 24.1°±0.2°, and 26.2°±0.2° in an X-ray powder diffraction (XRPD) pattern.

In some embodiments, the crystal form D has characteristic diffraction peaks in an X-ray powder diffraction (XRPD) pattern with positions and relative intensities shown in Table 5:

TABLE 5

Positions and relative intensities of characteristic diffraction peaks in the X-ray powder diffraction pattern of the crystal form D

| No. | 2θ (±0.2°) | Relative intensity (%) |
|---|---|---|
| 1 | 7.1 | 7.8 |
| 2 | 8.9 | 8.7 |
| 3 | 9.8 | 28.1 |
| 4 | 13.2 | 29.4 |
| 5 | 13.5 | 30.4 |
| 6 | 13.8 | 12.3 |
| 7 | 14.7 | 90.8 |
| 8 | 16.3 | 19.7 |
| 9 | 17.3 | 12.9 |
| 10 | 18.0 | 14.6 |
| 11 | 18.6 | 42.9 |
| 12 | 19.7 | 25.8 |
| 13 | 20.1 | 20.9 |
| 14 | 20.9 | 10.1 |
| 15 | 21.2 | 29.8 |
| 16 | 21.9 | 22.5 |
| 17 | 22.4 | 13.0 |
| 18 | 23.0 | 100.0 |
| 19 | 24.1 | 46.2 |
| 20 | 26.2 | 31.9 |
| 21 | 27.5 | 17.2 |
| 22 | 27.8 | 17.1 |
| 23 | 28.6 | 10.2 |
| 24 | 29.7 | 12.7 |
| 25 | 33.1 | 16.1. |

In some embodiments, the crystal form D has an X-ray powder diffraction (XRPD) pattern with characteristics represented by the XRPD pattern shown in FIG. 8.

In some embodiments, the crystal form D has a differential scanning calorimetry (DSC) pattern with characteristics represented by the DSC pattern shown in FIG. 9.

In some embodiments, the crystal form D has an exothermic peak at 262.82±3° C. in a DSC pattern. In some embodiments, the crystal form D has an exothermic peak at 272.31±3° C. in a DSC pattern. In some embodiments, the crystal form D has exothermic peaks at 272.31±3° C. and/or 262.82±3° C. in a DSC pattern.

In some embodiments, the crystal form D has a thermogravimetric analysis (TGA) curve with characteristics represented by the TGA curve shown in FIG. 10.

In some embodiments, the crystal form D has a weight loss of 40.74%±0.2% at 425.0±3° C. in a thermogravimetric analysis curve.

In some embodiments, the crystal form D is prepared in a solvent selected from one of or a mixed solvent of one or more of methanol, ethanol, isopropanol, acetone and ethyl acetate. In some embodiments, the crystal form D is prepared in a solvent selected from one of or a mixed solvent of one or more of methanol, ethanol and isopropanol.

In some embodiments, the crystal form D is prepared in methanol.

The present application also provides a preparation method for the crystal form D of the sulfate salt of the compound of formula (I), comprising making the compound of formula (I) in contact with sulfuric acid.

In some embodiments, the preparation method for the crystal form D comprises the following steps:
(1) mixing the compound of formula (I) with a solvent D;
(2) adding a solution of sulfuric acid in a solvent D to the mixture of the step (1); and
(3) performing filtering and drying processes;
wherein the solvent D is selected from one of or a mixed solvent of one or more of methanol, ethanol, isopropanol, acetone and ethyl acetate, preferably selected from the group consisting of methanol, ethanol and isopropanol, and more preferably methanol.

In yet another aspect, the present application provides a phosphate salt of the compound of formula (I):

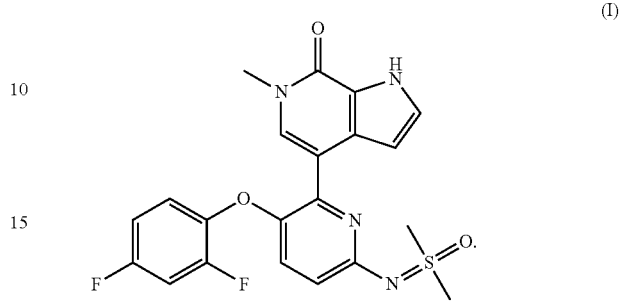

(I)

In some embodiments, the phosphate salt of the compound of formula (I) is shown in formula III

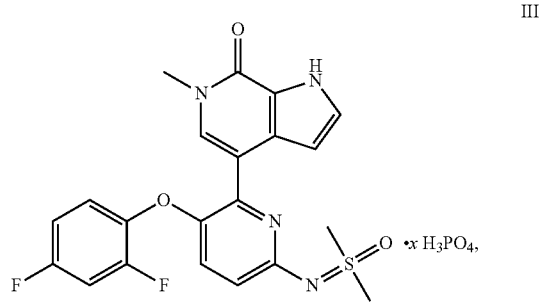 [SMILES: Cn1cc(-c2nc(N=S(C)(C)=O)ccc2Oc2ccc(F)cc2F)c2cc[nH]c2c1=O]

III wherein x is selected from 0.5-1.

In some embodiments, the x is selected from the group consisting of 0.5 and 1.

In some embodiments, the x is selected from 1.

In some embodiments, the phosphate salt of the compound of formula (I) has a phosphoric acid content of 10-20 wt %, preferably 12-19 wt %, or the phosphate salt of the compound of formula (I) has a phosphoric acid content selected from the group consisting of 12.1 wt %, 12.2 wt %, 12.3 wt %, 12.4 wt %, 12.5 wt %, 12.6 wt %, 12.7 wt %, 12.8 wt %, 12.9 wt %, 13.0 wt %, 13.1 wt %, 13.2 wt %, 13.3 wt %, 13.4 wt %, 13.5 wt %, 13.6 wt %, 13.7 wt %, 13.8 wt %, 13.9 wt %, 14.0 wt %, 14.1 wt %, 14.2 wt %, 14.3 wt %, 14.4 wt %, 14.5 wt %, 14.6 wt %, 14.7 wt %, 14.8 wt %, 14.9 wt %, 15.0 wt %, 15.1 wt %, 15.2 wt %, 15.3 wt %, 15.4 wt %, 15.5 wt %, 15.6 wt %, 15.7 wt %, 15.8 wt %, 15.9 wt %, 16.0 wt %, 16.1 wt %, 16.2 wt %, 16.3 wt %, 16.4 wt %, 16.5 wt %, 16.6 wt %, 16.7 wt %, 16.8 wt %, 16.9 wt %, 17.0 wt %, 17.1 wt %, 17.2 wt %, 17.3 wt %, 17.4 wt %, 17.5 wt %, 17.6 wt %, 17.7 wt %, 17.8 wt %, 17.9 wt %, 18.0 wt %, 18.1 wt %, 18.2 wt %, 18.3 wt %, 18.4 wt %, 18.5 wt %, 18.6 wt %, 18.7 wt %, 18.8 wt %, 18.9 wt %, 19.0 wt % and a range formed by any of the above values.

The present application also provides a crystal form E of the compound of formula (III), wherein the crystal form E has characteristic diffraction peaks at 2θ of 10.1°±0.2°, 10.5°±0.2°, 19.0°±0.2°, 21.0°±0.2°, 22.7°±0.2°, and 24.0°±0.2° in an X-ray powder diffraction (XRPD) pattern.

In some embodiments, the crystal form E has characteristic diffraction peaks at 2θ of 9.0°±0.2°, 10.1°±0.2°, 10.5°±0.2°, 17.9°±0.2°, 19.0°±0.2°, 21.0°±0.2°, 21.7°±0.2°, 22.7°±0.2 and 24.0°±0.2° in an X-ray powder diffraction (XRPD) pattern.

In some embodiments, the crystal form E has characteristic diffraction peaks at 2θ of 5.2°±0.2°, 9.0°±0.2°, 10.1°±0.2°, 10.5°±0.2°, 15.5°±0.2°, 17.9°±0.2°, 19.0°±0.2°, 20.2°±0.2°, 21.0°±0.2°, 21.7°±0.2°, 22.2°±0.2°, 22.7°±0.2°, 23.4°±0.2°, and 24.0°±0.2° in an X-ray powder diffraction (XRPD) pattern.

In some embodiments, the crystal form E has characteristic diffraction peaks in an X-ray powder diffraction (XRPD) pattern with positions and relative intensities shown in Table 6:

TABLE 6

Positions and relative intensities of characteristic diffraction peaks in the X-ray powder diffraction pattern of the crystal form E

| No. | 2θ (±0.2°) | Relative intensity (%) |
| --- | --- | --- |
| 1 | 5.2 | 4.2 |
| 2 | 9.0 | 12.3 |
| 3 | 10.1 | 32.7 |
| 4 | 10.5 | 30.9 |
| 5 | 13.6 | 10.2 |
| 6 | 14.3 | 14.3 |
| 7 | 15.5 | 25.0 |
| 8 | 15.7 | 20.5 |
| 9 | 17.0 | 18.6 |
| 10 | 17.3 | 16.4 |
| 11 | 18.0 | 30.1 |
| 12 | 19.0 | 37.6 |
| 13 | 20.2 | 22.9 |
| 14 | 21.0 | 100.0 |
| 15 | 21.7 | 31.8 |
| 16 | 22.2 | 24.3 |
| 17 | 22.7 | 40.6 |
| 18 | 23.4 | 29.7 |
| 19 | 24.0 | 32.1 |
| 20 | 25.8 | 10.7 |
| 21 | 26.1 | 12.2 |
| 22 | 27.4 | 11.7 |
| 23 | 28.9 | 13.8 |
| 24 | 29.2 | 15.7 |
| 25 | 29.4 | 14.2 |
| 26 | 29.6 | 16.0 |
| 27 | 33.3 | 13.3. |

In some embodiments, the crystal form E has an X-ray powder diffraction (XRPD) pattern with characteristics represented by the XRPD pattern shown in FIG. 11.

In some embodiments, the crystal form E has a differential scanning calorimetry (DSC) pattern with characteristics represented by the DSC pattern shown in FIG. 12.

In some embodiments, the crystal form E has an endothermic peak at 171.37±3° C. in a DSC pattern. In some embodiments, the crystal form E has an endothermic peak at 159.07±3° C. in a DSC pattern. In some embodiments, the crystal form E has an endothermic peak at 141.12±3° C. in a DSC pattern. In some embodiments, the crystal form E has an endothermic peak at 116.46±3° C. in a DSC pattern. In some embodiments, the crystal form E has endothermic peaks at 171.37±3° C., and/or 159.07±3° C., and/or 141.12±3° C., and/or 116.46±3° C. in a DSC pattern.

In some embodiments, the crystal form E has a thermogravimetric analysis (TGA) curve with characteristics represented by the TGA curve shown in FIG. 13.

In some embodiments, the crystal form E has a weight loss of 2.24%±0.2% at 157.5±3° C. in a thermogravimetric analysis curve.

In some embodiments, the crystal form E has a weight loss of 2.24%±0.2% at 157.5±3° C., and/or a weight loss of 7.85%±0.2% at 270.8±3° C., and/or a weight loss of 27.85%±0.2% at 493.8±3° C. in a thermogravimetric analysis.

In some embodiments, the crystal form E is prepared in a solvent selected from one of or a mixed solvent of one or more of methanol, ethanol, isopropanol, acetone, ethyl acetate and acetonitrile. In some embodiments, the crystal form E is prepared in a solvent selected from one of or a mixed solvent of one or more of ethyl acetate and acetonitrile. In some embodiments, the crystal form E is prepared in acetonitrile.

The present application also provides a preparation method for the crystal form E of the phosphate salt of the compound of formula (I), comprising making the compound of formula (I) in contact with phosphoric acid.

In some embodiments, the preparation method for the crystal form E comprises the following steps:
(1) mixing the compound of formula (I) with a solvent E;
(2) adding phosphoric acid to the mixture of the step (1); and
(3) performing filtering and drying processes;
wherein the solvent E is selected from one of or a mixed solvent of one or more of methanol, ethanol, isopropanol, acetone, ethyl acetate and acetonitrile, preferably selected from the group consisting of ethyl acetate and acetonitrile, and more preferably acetonitrile.

In yet another aspect, the present application provides a mesylate salt of the compound of formula (I):

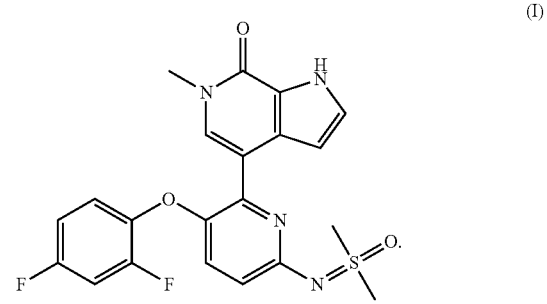 [SMILES: Cn1cc(-c2nc(N=S(C)(C)=O)ccc2Oc2ccc(F)cc2F)c2cc[nH]c2c1=O]

(I)

In some embodiments, the mesylate salt of the compound of formula (I) is shown in formula IV

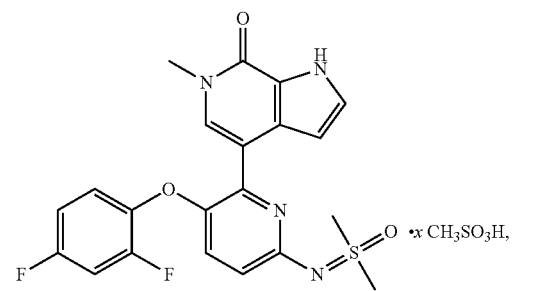

IV wherein x is selected from 0.5-1.

In some embodiments, the x is selected from the group consisting of 0.5 and 1.

In some embodiments, the x is selected from 1.

In some embodiments, the mesylate salt of the compound of formula (I) has a methanesulfonic acid content of 10-20 wt %, preferably 12-19 wt %, or the mesylate salt of the compound of formula (I) has a methanesulfonic acid content selected from the group consisting of 12.1 wt %, 12.2 wt %, 12.3 wt %, 12.4 wt %, 12.5 wt %, 12.6 wt %, 12.7 wt %, 12.8 wt %, 12.9 wt %, 13.0 wt %, 13.1 wt %, 13.2 wt %, 13.3 wt %, 13.4 wt %, 13.5 wt %, 13.6 wt %, 13.7 wt %, 13.8 wt %, 13.9 wt %, 14.0 wt %, 14.1 wt %, 14.2 wt %, 14.3 wt %, 14.4 wt %, 14.5 wt %, 14.6 wt %, 14.7 wt %, 14.8 wt %, 14.9 wt %, 15.0 wt %, 15.1 wt %, 15.2 wt %, 15.3 wt %, 15.4 wt %, 15.5 wt %, 15.6 wt %, 15.7 wt %, 15.8 wt %, 15.9 wt %, 16.0 wt %, 16.1 wt %, 16.2 wt %, 16.3 wt %, 16.4 wt %, 16.5 wt %, 16.6 wt %, 16.7 wt %, 16.8 wt %, 16.9 wt %, 17.0 wt %, 17.1 wt %, 17.2 wt %, 17.3 wt %, 17.4 wt %, 17.5 wt %, 17.6 wt %, 17.7 wt %, 17.8 wt %, 17.9 wt %, 18.0 wt %, 18.1 wt %, 18.2 wt %, 18.3 wt %, 18.4 wt %, 18.5 wt %, 18.6 wt %, 18.7 wt %, 18.8 wt %, 18.9 wt %, 19.0 wt % and a range formed by any of the above values.

The present application also provides a crystal form F of the compound of formula (IV), wherein the crystal form F has characteristic diffraction peaks at 2θ of 8.8°±0.2°, 10.1°±0.2°, 17.7°±0.2°, 18.0°±0.2°, 24.1°±0.2°, and 24.8°±0.2° in an X-ray powder diffraction (XRPD) pattern.

In some embodiments, the crystal form F has characteristic diffraction peaks at 2θ of 8.8°±0.2°, 10.1°±0.2°, 16.4°±0.2°, 17.7°±0.2°, 18.0°±0.2°, 21.7°±0.2°, 22.1°±0.2°, 24.1°±0.2, 24.8°±0.2° and 26.6°±0.2° in an X-ray powder diffraction (XRPD) pattern.

In some embodiments, the crystal form F has characteristic diffraction peaks at 2θ of 8.8°±0.2°, 10.1°±0.2°, 13.1°±0.2°, 14.3°±0.2°, 16.4°±0.2°, 17.7°±0.2°, 18.0°±0.2°, 20.2°±0.2°, 21.7°±0.2°, 22.1°±0.2°, 24.1°±0.2°, 24.8°±0.2°, 26.0°±0.2°, and 26.6°±0.2° in an X-ray powder diffraction (XRPD) pattern.

In some embodiments, the crystal form F has characteristic diffraction peaks in an X-ray powder diffraction (XRPD) pattern with positions and relative intensities shown in Table 7:

TABLE 7

Positions and relative intensities of characteristic diffraction peaks in the X-ray powder diffraction pattern of the crystal form F

| No. | 2θ (±0.2°) | Relative intensity (%) |
|---|---|---|
| 1 | 8.8 | 42.5 |
| 2 | 10.1 | 59.0 |
| 3 | 13.1 | 6.4 |
| 4 | 14.3 | 7.6 |
| 5 | 16.4 | 9.5 |
| 6 | 17.7 | 100.0 |
| 7 | 18.0 | 39.0 |
| 8 | 20.2 | 9.5 |
| 9 | 21.7 | 24.0 |
| 10 | 22.1 | 11.3 |
| 11 | 24.1 | 31.4 |
| 12 | 24.8 | 46.6 |
| 13 | 26.0 | 8.6 |
| 14 | 26.6 | 17.8 |
| 15 | 30.6 | 18.5. |

In some embodiments, the crystal form F has an X-ray powder diffraction (XRPD) pattern with characteristics represented by the XRPD pattern shown in FIG. 14.

In some embodiments, the crystal form F has a differential scanning calorimetry (DSC) pattern with characteristics represented by the DSC pattern shown in FIG. 15.

In some embodiments, the crystal form F has an exothermic peak at 282.74±3° C. in a DSC pattern. In some embodiments, the crystal form F has an endothermic peak at 221.41±3° C. in a DSC pattern. In some embodiments, the crystal form F has an endothermic peak at 167.36±3° C. in a DSC pattern. In some embodiments, the crystal form F has an endothermic peak at 167.36±3° C., and/or an endothermic peak at 221.41±3° C., and/or an exothermic peak at 282.74±3° C. in a DSC pattern.

In some embodiments, the crystal form F has a thermogravimetric analysis (TGA) curve with characteristics represented by the TGA curve shown in FIG. 16.

In some embodiments, the crystal form F has a weight loss of 2.80%±0.2% at 170.2±3° C. in a thermogravimetric analysis curve.

In some embodiments, the crystal form F has a weight loss of 2.80%±0.2% at 170.2±3° C., and/or a weight loss of 5.28%±0.2% at 261.4±3° C., and/or a weight loss of 9.21%±0.2% at 311.4±3° C., and/or a weight loss of 25.22%±0.2% at 396.3±3° C., and/or a weight loss of 13.88%±0.2% at 554.9±3° C. in a thermogravimetric analysis curve.

In some embodiments, the crystal form F is prepared in a solvent selected from one of or a mixed solvent of one or more of methanol, ethanol, isopropanol, acetone, ethyl acetate and acetonitrile. In some embodiments, the crystal form F is prepared in a solvent selected from one of or a mixed solvent of one or more of ethyl acetate and acetonitrile. In some embodiments, the crystal form F is prepared in acetonitrile.

The present application also provides a preparation method for the crystal form F, comprising making the compound of formula (I) in contact with methanesulfonic acid.

In some embodiments, the preparation method for the crystal form F comprises the following steps:
(1) mixing the compound of formula (I) with a solvent F;
(2) adding methanesulfonic acid to the mixture of the step (1); and
(3) performing filtering and drying processes;
wherein the solvent F is selected from one of or a mixed solvent of one or more of methanol, ethanol, isopropanol, acetone, ethyl acetate and acetonitrile, preferably selected from the group consisting of ethyl acetate and acetonitrile, and more preferably acetonitrile.

In yet another aspect, the present application provides a crystalline composition, comprising the crystal form described above, wherein the crystal form accounts for 50% or more, preferably 80% or more, more preferably 90% or more and most preferably 95% or more of the weight of the crystalline composition.

In yet another aspect, the present application provides a pharmaceutical composition, comprising the crystal form or the crystalline composition thereof described above. The pharmaceutical composition may also optionally comprise a pharmaceutically acceptable carrier, excipient and/or vehicle. In addition, the pharmaceutical composition of the present application may further comprise one or more additional therapeutic agents.

In some embodiments, the pharmaceutical composition comprises the crystal form I or the crystalline composition thereof, the crystal form A or the crystalline composition thereof, the crystal form B or the crystalline composition thereof, the crystal form C or the crystalline composition thereof, the crystal form D or the crystalline composition thereof, the crystal form E or the crystalline composition thereof, or the crystal form F or the crystalline composition thereof. In some embodiments, the pharmaceutical composition comprises the crystal form I, the crystal form A, the crystal form B, the crystal form C, the crystal form D, the crystal form E, or the crystal form F. In some embodiments, the pharmaceutical composition comprises 0.0001-500 mg of the crystal form I, the crystal form A, the crystal form B, the crystal form C, the crystal form D, the crystal form E, or the crystal form F, preferably 0.001-250 mg of the crystal form I, the crystal form A, the crystal form B, the crystal form C, the crystal form D, the crystal form E, or the crystal form F, more preferably 0.005-100 mg of the crystal form I, the crystal form A, the crystal form B, the crystal form C, the crystal form D, the crystal form E, or the crystal form F, and most preferably 0.005-50 mg of the crystal form I, the crystal form A, the crystal form B, the crystal form C, the crystal form D, the crystal form E, or the crystal form F. The present application also provides a method for treating a disease mediated by BET protein in a mammal, comprising administering to the mammal (preferably a human) in need of the treatment a therapeutically effective amount of the crystal form, the salt form, the crystalline composition thereof, or the pharmaceutical composition thereof.

The present application also provides use of the crystal form, the salt form, the crystalline composition thereof, or the pharmaceutical composition thereof for preparing a medicament for treating a disease mediated by BET protein.

The present application also provides the crystal form, the salt form, the crystalline composition thereof, or the pharmaceutical composition thereof for use in treating a disease mediated by BET protein.

The present application also provides use of the crystal form, the salt form, the crystalline composition thereof, or the pharmaceutical composition thereof for treating a disease mediated by BET protein.

In some embodiments of the present application, the disease mediated by BET protein is selected from cancer. Preferably, the cancer is selected from the group consisting of a solid tumor and a hematological tumor. More preferably, the solid tumor is selected from the group consisting of breast cancer and prostate cancer. More preferably, the hematological tumor is selected from the group consisting of acute myelogenous leukemia, multiple myeloma, and diffuse large B-cell lymphoma.

Technical Effects

The crystal form of the present application has good stability and shows good results in stability tests such as high humidity, high temperature or light; it shows good pharmacological activity in an in vivo or in vitro test; when it is used as a raw material in a preparation, the obtained product has good solubility, dissolution or pharmacokinetic properties, suggesting that the crystal form of the present invention has good pharmaceutical properties and high druggability prospect. The crystal form of the present application contributes to the solid form of the compound.

Definitions

Unless otherwise stated, the following terms used herein shall have the following meanings. A certain term, unless otherwise specifically defined, should not be considered uncertain or unclear, but construed according to its common meaning in the field. When referring to a trade name, it is intended to refer to its corresponding commercial product or its active ingredient.

It should be noted that in the X-ray powder diffraction pattern, the position and relative intensity of a peak may vary due to measuring instruments, measuring methods/conditions, and other factors. For any specific crystal form, the position of a peak may have an error, and the measurement of 2θ may have an error of ±0.2°. Therefore, this error should be considered when determining each crystal form, and crystal forms within this margin of error are within the scope of the present application.

It should be noted that, for the same crystal form, the position of an endothermic peak in the DSC pattern may vary due to measuring instruments, measuring methods/conditions, and other factors. For any specific crystal form, the position of an endothermic peak may have an error of ±5° C. or ±3° C. Therefore, this error should be considered when determining each crystal form, and crystal forms within this margin of error are within the scope of the present application.

The term "hydrate" in the pharmaceutical field refers to a state in which a drug molecule undergoes a hydration reaction with water of crystallization to form a eutectic solid substance. One molecule of the compound of the present application may be combined with a water molecule, such as a monohydrate; one molecule of the compound of the present application may also be combined with more than one water molecule, such as a dihydrate, trihydrate or tetrahydrate; one molecule of the compound of the present application may also be combined with less than one water molecule, such as a hemihydrate. The hydrates described herein retain the bioavailability of the compound in a non-hydrated form.

The word "comprise" and variations thereof such as "comprises" or "comprising" or equivalents thereof should be understood in an open and non-exclusive sense, i.e., "including but not limited to".

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio. The term "pharmaceutically acceptable excipient" refers to an inert substance administered with an active ingredient to facilitate administration of the active ingredient, including but not limited to, any glidant, sweetener, diluent, preservative, dye/coloring agent, flavor enhancer, surfactant, wetting agent, dispersant, disintegrant, suspending agent, stabilizer, isotonizing agent, solvent or emulsifier acceptable for use in humans or animals (e.g., domesticated animals) as permitted by the National Medical Products Administration, PRC. Non-limiting examples of the excipient include calcium carbonate, calcium phosphate, various sugars and types of starch, cellulose derivatives, gelatin, vegetable oils, and polyethylene glycols.

The term "pharmaceutical composition" refers to a mixture consisting of one or more of the compounds or the salts thereof of the present application and a pharmaceutically acceptable excipient. The pharmaceutical composition is intended to facilitate the administration of the compound of the present application to an organism.

The pharmaceutical composition of the present application can be prepared by combining the compound of the present application with a suitable pharmaceutically acceptable excipient, and can be formulated, for example, into a solid, semisolid, liquid, or gaseous formulation such as a tablet, a pill, a capsule, a powder, a granule, an ointment, an emulsion, a suspension, a suppository, an injection, an inhalant, a gel, a microsphere, and an aerosol.

Typical routes of administration of the crystal form or the pharmaceutical composition thereof of the present application include, but are not limited to, oral, rectal, topical, inhalation, parenteral, sublingual, intravaginal, intranasal, intraocular, intraperitoneal, intramuscular, subcutaneous and intravenous administration.

The pharmaceutical composition of the present application can be manufactured using methods well known in the art, such as conventional mixing, dissolving, granulating, dragee-making, levigating, emulsifying, and lyophilizing.

In some embodiments, the pharmaceutical composition is in an oral form. For oral administration, the pharmaceutical composition can be formulated by mixing the active compounds with pharmaceutically acceptable excipients well known in the art. Those excipients enable the compound of the present application to be formulated into tablets, pills, pastilles, dragees, capsules, liquids, gels, slurries, suspensions, etc. for oral administration to a patient.

Therapeutic dosages of the compound of the present application may be determined depending on, for example, the specific use of a treatment, the route of administration of the compound, the health and condition of a patient, and the discretion of a prescribing physician. The proportion or concentration of the compound of the present application in a pharmaceutical composition may not be constant and depends on a variety of factors including dosages, chemical properties (e.g., hydrophobicity), and routes of administration. The term "treat", "treating" or "treatment" means administering the compound or formulation of the present application to ameliorate or eliminate a disease or one or more symptoms associated with the disease, and includes:

(i) inhibiting a disease or disease state, i.e., arresting its development; and
(ii) alleviating a disease or disease state, i.e., causing its regression.

The term "prevent", "preventing" or "prevention" means administering the compound or formulation of the present application to prevent a disease or one or more symptoms associated with the disease, and includes: preventing the occurrence of the disease or disease state in a mammal, particularly when such a mammal is predisposed to the disease state but has not yet been diagnosed with it.

For drugs or pharmacological active agents, the term "therapeutically effective amount" refers to an amount of a drug or a medicament that is sufficient to provide the desired effect but is non-toxic. The determination of the effective amount varies from person to person. It depends on the age and general condition of a subject, as well as the particular active substance used. The appropriate effective amount in a case may be determined by those skilled in the art in the light of routine tests.

The water content in the present application is determined by a water determination method (Method 1 of General Chapter 0832, *Chinese Pharmacopoeia*, Volume IV, 2015 Edition).

The term "particle size distribution $X_{90}$" refers to the particle size of a powder sample when the cumulative volume distribution reaches 90%.

The particle size distribution $X_{90}$ described herein is determined by a light scattering method (Method 3 of Determination of Particle Size and Distribution of General Chapter 0982, *Chinese Pharmacopoeia*, Volume IV, 2020 Edition).

The therapeutically effective amount of the crystal form of the present application is from about 0.0001 to 20 mg/kg body weight (bw)/day, for example from 0.001 to 10 mg/kg bw/day.

The dosage frequency of the crystal form of the present application depends on needs of an individual patient, e.g., once or twice daily or more times daily. Administration may be intermittent, for example, in a period of several days, the patient receives a daily dose of the crystal form, and in the following period of several days or more days, the patient does not receive the daily dose of the crystal form.

The intermediate compounds of the present application can be prepared by a variety of synthetic methods well known to those skilled in the art, including the specific embodiments listed below, embodiments formed by combinations thereof with other chemical synthetic methods, and equivalents thereof known to those skilled in the art. The preferred embodiments include, but are not limited to, the examples of the present application.

The chemical reactions of the embodiments of the present application are performed in an appropriate solvent that must be suitable for the chemical changes in the present application and the reagents and materials required. In order to acquire the compounds of the present application, it is sometimes necessary for those skilled in the art to modify or select a synthesis procedure or a reaction scheme based on the existing embodiments.

Herein, the terms in singular forms encompass plural referents and vice versa, unless otherwise indicated clearly in the context.

Herein, unless otherwise stated, all parameter values (including 20 values, reaction conditions) are considered to be modified by the term "about" to reflect a measurement error and other errors that exist for each value, e.g., a ±5% error relative to the given value.

All patents, patent applications and other identified publications are expressly incorporated herein by reference for the purpose of description and disclosure. Those publications are provided solely because they were disclosed prior to the filing date of the present application. All statements as to the dates of those documents or description as to the contents of those documents are based on the information available to the applicant and do not constitute any admission as to the correctness of the dates or the content of those documents. Moreover, in any country or region, any reference to those publications herein is not to be construed as an admission that the publications form part of the commonly recognized knowledge in the art.

DETAILED DESCRIPTION

Figure 1:
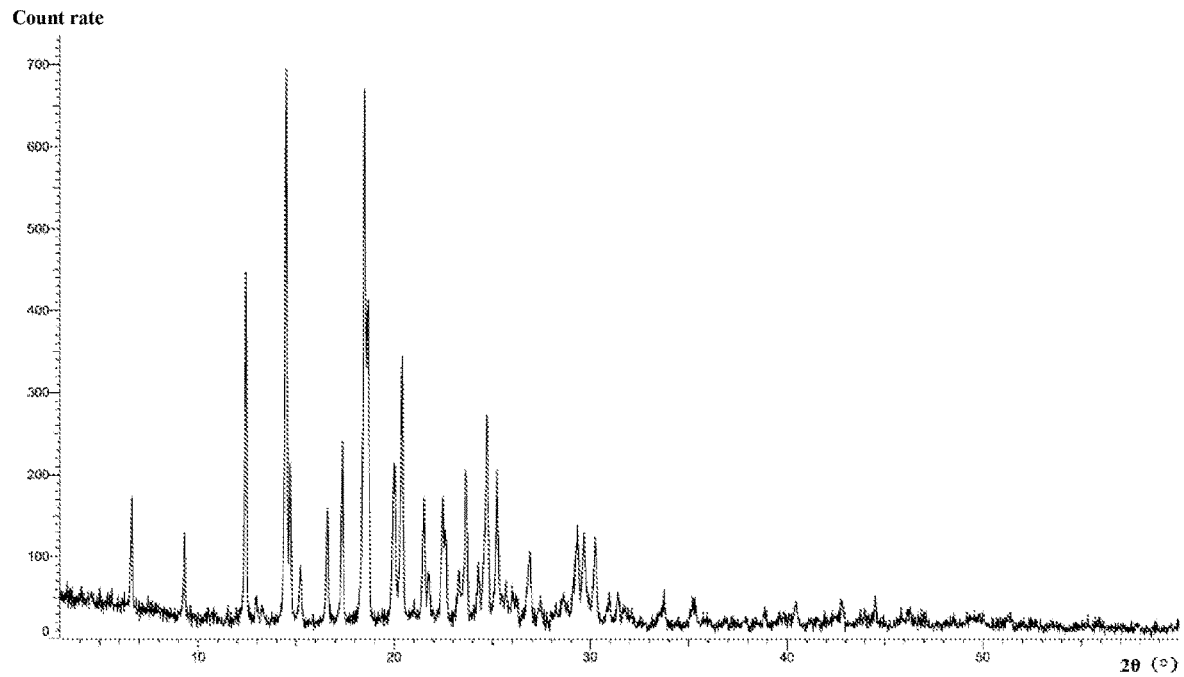
FIG. 1 is an XRPD pattern of the crystal form I.

In order to better understand the content of the present application, further description is given with reference to specific examples, but the specific embodiments are not intended to limit the content of the present application. All solvents used in the present application are commercially available and can be used without further purification. The following abbreviations are used in the present application: DCM represents dichloromethane; DMF represents N,N-dimethylformamide; DMSO represents dimethyl sulfoxide; MeOH represents methanol; ACN represents acetonitrile; EtOAc represents ethyl acetate; PE represents petroleum ether; CDCl$_3$ represents deuterated chloroform; (Boc)$_2$O represents di-tert-butyl dicarbonate; Boc represents tert-butyloxycarbonyl; DMAP represents 4-dimethylaminopyridine; N$_2$ represents nitrogen; MS represents mass spectrum; Pd$_2$(dba)$_3$ represents tris(dibenzylideneacetone)dipalladium; XantPhos represents 4,5-bis(diphenylphosphino)-9,9-dimethylxanthene; and Xphos represents 2-dicyclohexylphosphonium-2',4',6'-triisopropylbiphenyl. The term "room temperature" as used herein refers to normal temperature, typically 10-30° C.

Specific Procedures for XRPD, DSC and TGA Methods (Including Instrument Model and Parameters)

X-Ray Powder Diffractometer (XRPD) Method of the Present Application

Instrument model: Bruker D8 Advance X-ray diffractometer

The detailed XRPD parameters are as follows:

Target: Cu

Voltage of X-ray tube: 40 kV, current of X-ray tube: 40 mA

Scanning angle range: 3.00-60.00 Deg

Step size: 0.02°

Scanning interval: 0.1 s

Differential Scanning Calorimetry (DSC) Method of the Present Application

Instrument model: METTLER TOLEDO DSC1 differential thermal analyzer

Temperature range: 50-320° C.

Heating rate: 10 K/min

Thermal Gravimetric Analyzer (TGA) Method of the Present Application

Instrument model: NETZSCH TG 209F3 thermogravimetric analyzer

Temperature range: 30-700° C.

Heating rate: 10 K/min

Example 1

Compound of Formula (I)

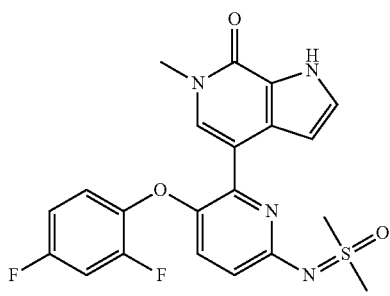

(I)

Step A: Ethyl 5-fluoropicolinate

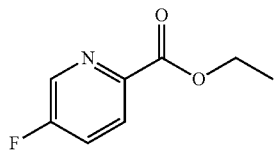

To a solution of 5-fluoropicolinic acid (5.00 g) in ethanol (42 mL) were sequentially added DMF (0.1 mL) and thionyl chloride (5.6 mL) slowly and dropwise at 0° C. After the addition, the mixture was stirred for 15 min, and slowly heated to reflux for 4 h. The reaction mixture was cooled and concentrated under reduced pressure. The residue was poured into ice water, and the resulting mixture was adjusted to pH 8-9 with a saturated sodium bicarbonate solution and extracted 3 times with ethyl acetate. The extracts were combined, washed sequentially with water and saturated brine, dried over anhydrous sodium sulfate, and concentrated under reduced pressure to remove the solvent to give the product (5.50 g).

Step B: Ethyl 5-(2,4-difluorophenoxy)picolinate

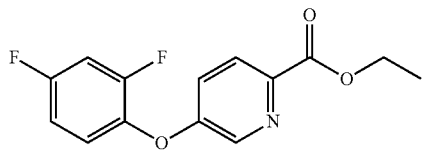 [SMILES: CCOC(=O)c1ccc(Oc2ccc(F)cc2F)cn1]

To a solution of ethyl 5-fluoropicolinate (5.40 g) in DMF (60 mL) were sequentially added 2,4-difluorophenol (4.15 g) and potassium carbonate (8.82 g) at room temperature, and the mixture was heated to 100° C. and reacted overnight. The reaction mixture was cooled, diluted with water (400 mL) and extracted with 3 times with ethyl acetate. The extracts were combined, washed sequentially with water and saturated brine, dried over anhydrous sodium sulfate, and concentrated under reduced pressure to remove the solvent to give the product (8.40 g).

$^1$H NMR (400 MHz, CDCl$_3$) δ 8.48 (d, J=2.8 Hz, 1H), 8.10 (d, J=8.8 Hz, 1H), 7.15-7.24 (m, 2H), 6.92-7.04 m, 2H), 4.46 (q, J=7.2 Hz, 2H), 1.44 (t, J=7.2 Hz, 3H).

Step C: 5-(2,4-difluorophenoxy)-2-(ethoxycarbonyl)pyridine 1-oxide

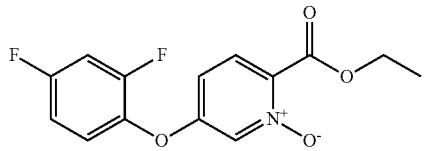 [SMILES: CCOC(=O)c1ccc(Oc2ccc(F)cc2F)c[n+]1[O-]]

To a solution of ethyl 5-(2,4-difluorophenoxy)picolinate (1.00 g) in dichloromethane (30 mL) was added 85% m-chloroperoxybenzoic acid (1.45 g) at room temperature. After the addition, the mixture was reacted overnight at room temperature. After the reaction was completed, the reaction mixture was added with a saturated sodium bicarbonate solution (40 mL), stirred for 15 min, and extracted 3 times with dichloromethane. The extracts were combined, washed sequentially with a saturated sodium thiosulfate solution, water and saturated brine, dried over anhydrous sodium sulfate, and concentrated under reduced pressure to remove the solvent to give the product (1.00 g).

$^1$H NMR (400 MHz, CDCl$_3$) δ 7.95 (d, J=2.4 Hz, 1H), 7.63 (d, J=8.8 Hz, 1H), 7.19 (td, J=8.8 Hz, 5.6 Hz, 1H), 6.93-7.04 (m, 2H), 6.86 (dd, J=8.8 Hz, 2.4 Hz, 1H), 4.44 (q, J=7.2 Hz, 2H), 1.40 (t, J=7.2 Hz, 3H).

Step D: Ethyl 6-bromo-5-(2,4-difluorophenoxy)picolinate

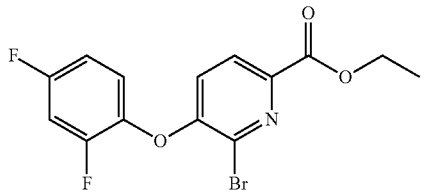 [SMILES: CCOC(=O)c1ccc(Oc2ccc(F)cc2F)c(Br)n1]

To a solution of 5-(2,4-difluorophenoxy)-2-(ethoxycarbonyl)pyridine 1-oxide (1.00 g) in DMF (15 mL) were sequentially added tetramethylammonium bromide (1.37 g) and methanesulfonic anhydride (1.24 g) at 0° C. After the addition, the mixture was slowly warmed to room temperature and reacted for 3 h. After the reaction was completed, the reaction mixture was poured into a sodium bicarbonate solution containing ice water (40 mL), stirred for 5 min, and extracted 3 times with ethyl acetate. The extracts were combined, washed sequentially with water and saturated brine, dried over anhydrous sodium sulfate, and concentrated under reduced pressure. The residue was purified by silica gel column chromatography (EtOAc/PE=1/5-1/1) to give the product (0.80 g). $^1$H NMR (400 MHz, CDCl$_3$) δ 7.99 (d, J=8.0 Hz, 1H), 7.20 (td, J=8.8 Hz, 5.6 Hz, 1H), 6.94-7.05 (m, 3H), 4.46 (q, J=7.2 Hz, 2H), 1.42 (t, J=7.2 Hz, 3H).

Step E: 6-bromo-5-(2,4-difluorophenoxy)picolinic acid

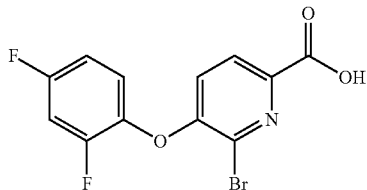 [SMILES: O=C(O)c1ccc(Oc2ccc(F)cc2F)c(Br)n1]

To a solution of ethyl 6-bromo-5-(2,4-difluorophenoxy) picolinate (0.60 g) in tetrahydrofuran (10 mL) was added a 30% potassium hydroxide solution (1.50 mL) at 0° C. After the addition, the reaction mixture was warmed to room temperature and reacted for 2 h. After the reaction was completed, the reaction mixture was concentrated under reduced pressure. The residue was added with water, and the resulting mixture was adjusted to pH 4-5 with diluted hydrochloric acid, stirred for 5 min and filtered. The solid was collected to give the product (0.50 g).

Step F: Tert-butyl [6-bromo-5-(2,4-difluorophenoxy)pyridin-2-yl]carbamate

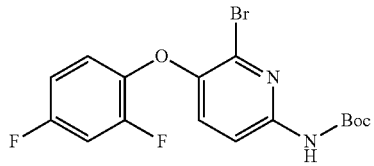 [SMILES: CC(C)(C)OC(=O)Nc1ccc(Oc2ccc(F)cc2F)c(Br)n1]

To a solution of 6-bromo-5-(2,4-difluorophenoxy)picolinic acid (0.45 g) in anhydrous tert-butanol (10 mL) were sequentially added diphenylphosphoryl azide (0.75 g), triethylamine (0.80 mL) and di-tert-butyl dicarbonate (1.19 g) at room temperature. After the addition, the reaction mixture was heated to 90° C. and reacted for 4 h. After the reaction was completed, the reaction mixture was concentrated under reduced pressure. The residue was poured into a saturated sodium bicarbonate solution containing ice water (20 mL), and the resulting mixture was extracted 3 times with ethyl acetate. The extracts were combined, washed sequentially with water and saturated brine, dried over anhydrous sodium sulfate, and concentrated under reduced pressure. The residue was purified by silica gel column chromatography (EtOAc/PE=1/10-1/3) to give the product (0.31 g).

$^1$H NMR (400 MHz, CDCl$_3$) δ 7.84 (d, J=8.8 Hz, 1H), 7.21 (s, 1H), 7.15 (d, J=8.8 Hz, 1H), 6.92-6.99 (m, 2H), 6.81-6.87 (m, 1H), 1.51 (s, 9H).

Step G: 6-bromo-5-(2,4-difluorophenoxy)pyridin-2-amine

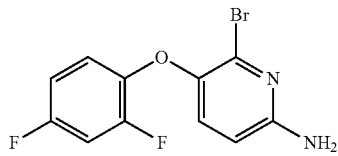 [SMILES: Nc1ccc(Oc2ccc(F)cc2F)c(Br)n1]

To a solution of tert-butyl [6-bromo-5-(2,4-difluorophenoxy)pyridin-2-yl]carbamate (0.31 g) in dioxane (10 mL) was added concentrated hydrochloric acid (5 mL) dropwise at 0° C. After the addition, the mixture was warmed to room temperature and reacted for 24 h. After the reaction was completed, the reaction mixture was concentrated under reduced pressure. The residue was poured into a saturated sodium bicarbonate solution containing ice water (20 mL), and the resulting mixture was extracted 3 times with ethyl acetate. The extracts were combined, washed sequentially with water and saturated brine, dried over anhydrous sodium sulfate, and concentrated under reduced pressure to give the product (0.22 g).

$^1$H NMR (400 MHz, CDCl$_3$) δ 7.09 (d, J=8.4 Hz, 1H), 6.91-6.97 (m, 1H), 6.75-6.86 (m, 2H), 6.42 (d, J=8.4 Hz, 1H), 4.52 (brs, 2H).

Step H: 2-bromo-3-(2,4-difluorophenoxy)-6-iodopyridine

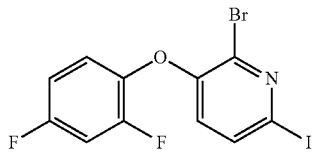 [SMILES: Fc1ccc(Oc2ccc(I)nc2Br)c(F)c1]

To a solution of 6-bromo-5-(2,4-difluorophenoxy)pyridin-2-amine (0.32 g) in diiodomethane (4 mL) were sequentially added iodine (0.27 g) and copper(I) iodide (0.20 g) at room temperature. The mixture was heated to 80° C., added with isoamyl nitrite (0.34 g) dropwise, and reacted for 2 h after the addition. After the reaction was completed, the reaction mixture was cooled and poured into a sodium bicarbonate solution containing ice water (20 mL), and the resulting mixture was extracted 3 times with dichloromethane. The extracts were combined, washed sequentially with water and saturated brine, dried over anhydrous sodium sulfate, and concentrated under reduced pressure, and the residue was purified by silica gel column chromatography (DCM/PE=1/10-1/3) to give the product (0.20 g).

$^1$H NMR (400 MHz, CDCl$_3$) δ 7.55 (d, J=8.4 Hz, 1H), 7.11 (td, J=8.8 Hz, 5.6 Hz, 1H), 6.97-7.02 (m, 1H), 6.89-6.94 (m, 1H), 6.67 (dd, J=8.4 Hz, 0.8 Hz, 1H).

Step I: ((6-bromo-5-(2,4-difluorophenoxy)pyridin-2-yl)imino)dimethyl-λ$^6$-sulfonimide

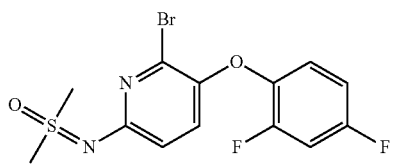 [SMILES: CS(C)(=O)=Nc1ccc(Oc2ccc(F)cc2F)c(Br)n1]

To anhydrous dioxane (4 mL) were sequentially added 2-bromo-3-(2,4-difluorophenoxy)-6-iodopyridine (0.09 g), dimethylsulfoximine (25 mg), cesium carbonate (0.14 g), Xantphos (10 mg), and Pd$_2$(dba)$_3$ (8 mg) under N$_2$ atmosphere, and the mixture was heated to 100° C. and stirred for 3 h. The reaction mixture was cooled to room temperature and added with water, and the resulting mixture was extracted with ethyl acetate. The extract was washed with water and saturated brine, dried over anhydrous sodium sulfate, and concentrated under reduced pressure. The residue was separated by preparative thin-layer chromatography (EtOAc/PE=1/1) to give the product.

$^1$H NMR (400 MHz, CDCl$_3$) δ 7.10 (d, J=8.4 Hz, 1H), 6.92-6.97 (m, 1H), 6.87 (td, J=8.8 Hz, 5.6 Hz, 1H), 6.77-6.82 (m, 1H), 6.69 (d, J=8.4 Hz, 1H), 3.37 (s, 6H).

Step J: Tert-butyl 4-bromo-6-methyl-7-oxo-6,7-dihydro-1-pyrrolo[2,3-c]pyridine-1-carboxylate

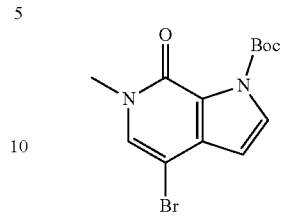

To a solution of 4-bromo-6-methyl-1,6-dihydro-7H-pyrrolo[2,3-c]pyridin-7-one (1.73 g) in acetonitrile (20 mL) were sequentially added (Boc)$_2$O (2.47 g) and DMAP (1.44 g), and the mixture was stirred at room temperature overnight. The reaction mixture was concentrated, and the residue was purified by silica gel column chromatography (ethyl acetate/petroleum ether=1/20) to give the product (2.10 g).

$^1$H NMR (400 MHz, CDCl$_3$) δ 7.55 (d, J=3.6 Hz, 1H), 7.21 (s, 1H), 6.35 (d, J=3.6 Hz, 1H), 3.55 (s, 3H), 1.62 (s, 9H).

Step K: Tert-butyl 6-methyl-7-oxo-4-(4,4,5,5-tetramethyl-1,3,2-dioxaborolan-2-yl)-6,7-dihydro-1H-pyrrolo[2,3-c]pyridine-1-carboxylate

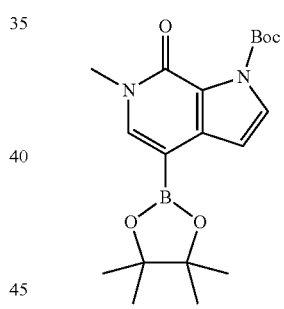

To a mixed solvent of 1,4-dioxane (20 mL) and water (2 mL) were sequentially added tert-butyl 4-bromo-6-methyl-7-oxo-6,7-dihydro-1H-pyrrolo[2,3-c]pyridine-1-carboxamide (0.53 g), bis(pinacolato)diboron (0.66 g), Xphos (31 mg), potassium acetate (0.28 g), and Pd$_2$(dba)$_3$ (30 mg) under N$_2$ atmosphere, and the mixture was heated to 80° C., stirred overnight, and cooled to room temperature. The reaction mixture was dispersed in ethyl acetate, washed sequentially with a saturated aqueous NaHCO$_3$ solution and water, dried over anhydrous sodium sulfate, and evaporated to remove the solvent. The residue was purified by silica gel column chromatography (EtOAc/PE=1/3-1/1) to give the product.

$^1$H NMR (400 MHz, CDCl$_3$) δ 7.60 (s, 1H), 7.55 (d, J=3.6 Hz, 1H), 6.79 (d, J=3.6 Hz, 1H), 3.62 (s, 3H), 1.65 (s, 9H), 1.34 1.65 (s, 12H).

Step L: Tert-butyl 4-{3-(2,4-difluorophenoxy)-6-{[dimethyl(oxo)-λ⁶-sulfaneylidene]amino}-pyridin-2-yl}-6-methyl-7-oxo-6,7-dihydro-1H-pyrrolo[2,3-c]pyridine-1-carboxylate

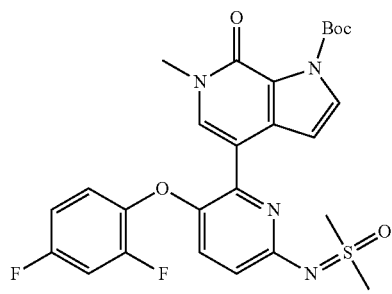 [SMILES: Cn1cc(-c2nc(N=S(C)(C)=O)ccc2Oc2ccc(F)cc2F)c2ccn(C(=O)OC(C)(C)C)c2c1=O]

To an 80% aqueous dioxane solution (3 mL) were sequentially added tert-butyl ((6-bromo-5-(2,4-difluorophenoxy)pyridin-2-yl)imino)dimethyl-λ⁶-sulfonimide (59 mg), 6-methyl-7-oxo-4-(4,4,5,5-tetramethyl-1,3,2-dioxaborolan-2-yl)-6,7-dihydro-1H-pyrrolo[2,3-c]pyridine-1-carboxylate (65 mg), cesium fluoride (83 mg), and PdCl₂(AtaPhos) (9 mg) under nitrogen atmosphere, and the mixture was heated to 85° C. and stirred overnight. The reaction mixture was cooled to room temperature and added with water, and the resulting mixture was extracted with ethyl acetate. The extract was washed with water and saturated brine, dried over anhydrous sodium sulfate, and concentrated under reduced pressure. The residue was separated by preparative thin-layer chromatography (MeOH/DCM=1/20) to give the product (58 mg).

¹H NMR (400 MHz, CDCl₃) δ 7.82 (s, 1H), 7.58-7.59 (m, 1H), 7.23 (d, J=8.4 Hz, 1H), 7.15-7.17 (m, 1H), 6.85-6.92 (m, 1H), 6.65-6.75 (m, 3H), 3.63 (s, 3H), 3.33 (s, 6H), 1.65 (s, 9H).

Step M: 4-{3-(2,4-difluorophenoxy)-6-{[dimethyl(oxo)-λ⁶-sulfaneylidene]amino}-pyridin-2-yl}-6-methyl-1,6-dihydro-7H-pyrrolo[2,3-c]pyridin-7-one

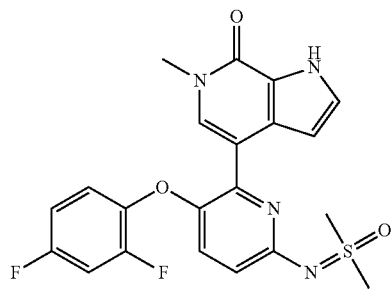 [SMILES: Cn1cc(-c2nc(N=S(C)(C)=O)ccc2Oc2ccc(F)cc2F)c2cc[nH]c2c1=O]

To tert-butyl 4-{3-(2,4-difluorophenoxy)-6-{[dimethyl(oxo)-λ⁶-sulfaneylidene]amino}-pyridin-2-yl}-6-methyl-7-oxo-6,7-dihydro-1H-pyrrolo[2,3-c]pyridine-1-carboxylate (50 mg) was added a 4 mol/L hydrogen chloride dioxane solution (1 mL) at room temperature. After the addition, the mixture was warmed to room temperature and reacted for 2 h. After the reaction was completed, the reaction mixture was concentrated under reduced pressure. The residue was poured into a sodium bicarbonate solution containing ice water (5 mL), and the resulting mixture was extracted 3 times with ethyl acetate. The extracts were combined, washed sequentially with water and saturated brine, dried over anhydrous sodium sulfate, and concentrated under reduced pressure to give the product (35 mg).

¹H NMR (400 MHz, CDCl₃) δ 12.01 (brs, 1H), 9.56 (brs, 1H), 7.72 (s, 1H), 7.24 (d, J=8.8 Hz, 1H), 7.14 (t, J=2.4 Hz, 1H), 6.85-6.91 (m, 1H), 6.64-6.76 (m, 3H), 3.66 (s, 3H), 3.35 (s, 6H).

Example 2

Preparation Method for Crystal Form I

Method I 1 g of the compound of formula (I) was taken and added with 10 mL of DMSO, and the mixture was heated to 80° C., and stirred until the compound was dissolved. 30 mL of purified water was taken and added dropwise with the solution of the compound of formula (I) in DMSO while stirring in an ice bath, and the mixture was stirred for 10 min. The precipitated solid was filtered, and the filter cake was dried under reduced pressure at 60° C. for 2 h to give the product, which was determined to be the crystal form I by XRPD.

Method II 1 g of the compound of formula (I) was taken and added with 5 mL of DMSO, and the mixture was heated to 100° C., and stirred until the compound was dissolved. The mixture was cooled naturally for crystallization and filtered, and the filter cake was dried under reduced pressure at 60° C. to give the product, which was determined to be the crystal form I by XRPD.

Method III 1 g of the compound of formula (I) was taken and added with 10 mL of DMSO, and the mixture was heated to 80° C., and stirred until the compound was dissolved. 30 mL of absolute methanol was taken and added dropwise with the solution of the compound of formula (I) in DMSO while stirring in an ice bath, and the mixture was stirred for 10 min. The precipitated solid was filtered, and the filter cake was dried under reduced pressure at 60° C. for 3.5 h to give the product, which was determined to be the crystal form I by XRPD, with the XRPD pattern shown in FIG. 1.

Figure 2:
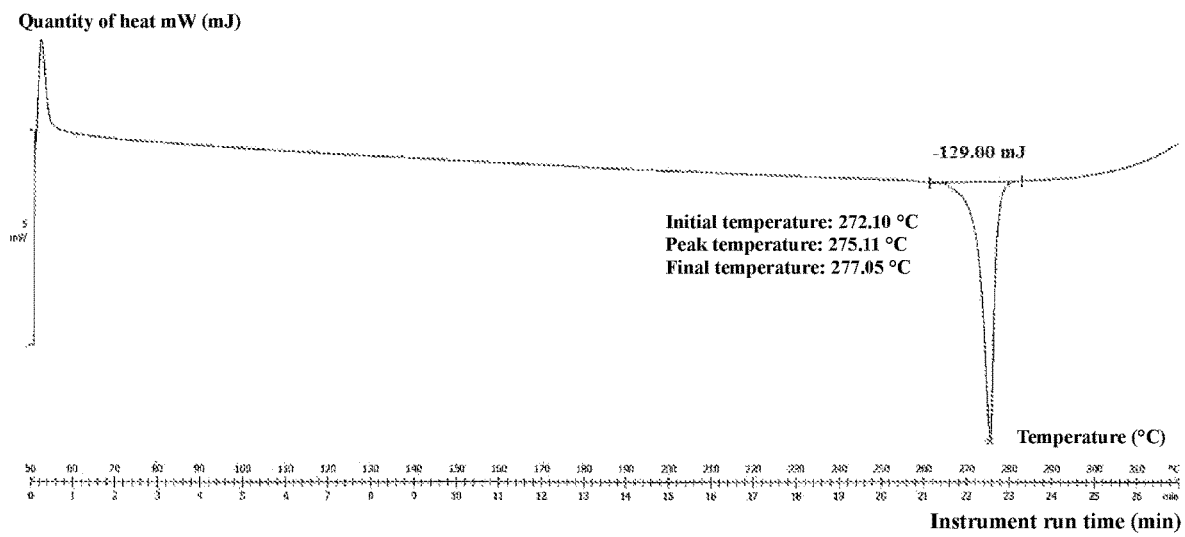
FIG. 2 is a DSC pattern of the crystal form I.

Method IV 1.0 g of the compound of formula (I) was taken and added with 400 mL of DCM and 100 mL of methanol, and the mixture was stirred at room temperature until the compound was dissolved. The mixture was concentrated under reduced pressure at 30-35° C., and the residue was dried under reduced pressure at 35° C. to give the product, which was determined to be the crystal form I by XRPD, with the DSC pattern shown in FIG. 2.

Method V 10 g of a hydrochloride salt of the compound of formula (I) was taken and added with 200 mL of purified water, and the mixture was stirred at room temperature for 4 h. The mixture was filtered, and the filter cake was collected, dried under reduced pressure at 50° C. for 3.5 h to give the product, which was determined to be the crystal form I by XRPD.

Method VI 0.5 g of a hydrochloride salt of the compound of formula (I) was taken and added with 10 mL of 20% acetonitrile/water solution, and the mixture was stirred at room temperature for 3 h. The mixture was filtered, and the filter cake was collected, dried under reduced pressure at 50° C. for 4 h to give the product, which was determined to be the crystal form I by XRPD.

Method VII 1 g of a hydrochloride salt of the compound of formula (I) was taken and added with 15 mL of methanol, and the mixture was heated to 60° C., and stirred until the salt was dissolved. The mixture added with 30 mL of water, cooled for crystallization for 0.5 h and filtered, and the filter cake was dried under reduced pressure at 60° C. for 3 h to give the product, which was determined to be the crystal form I by XRPD.

The hydrochloride salt of the compound of formula (I) used in methods V-VII is the crystal form A.

Example 3

Preparation Method for Crystal Form of hydrochloride Salt

Figure 4:
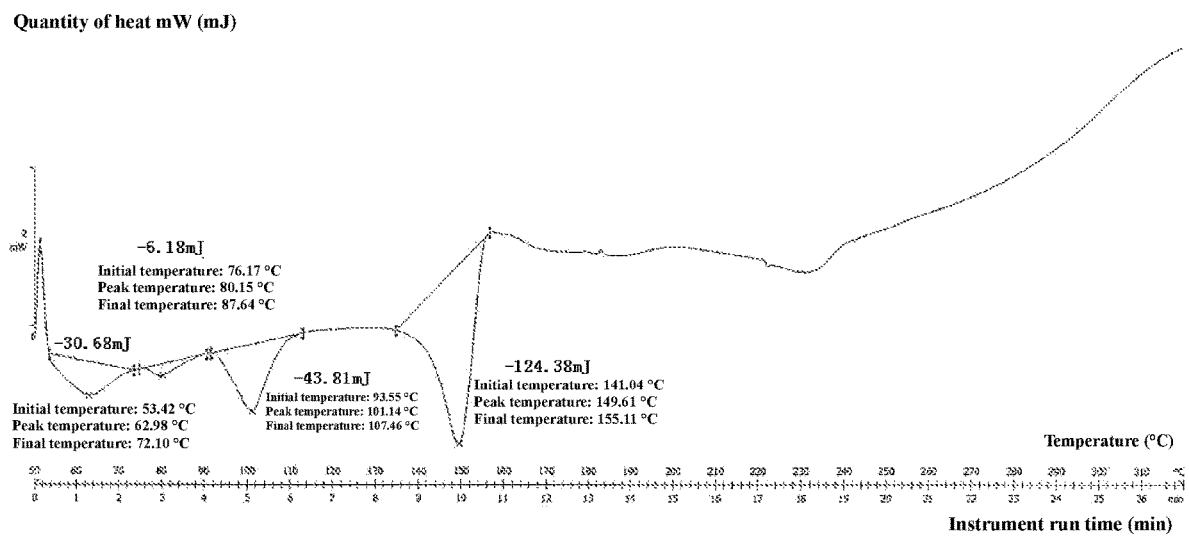
FIG. 4 is a DSC pattern of the crystal form A.
Figure 5:
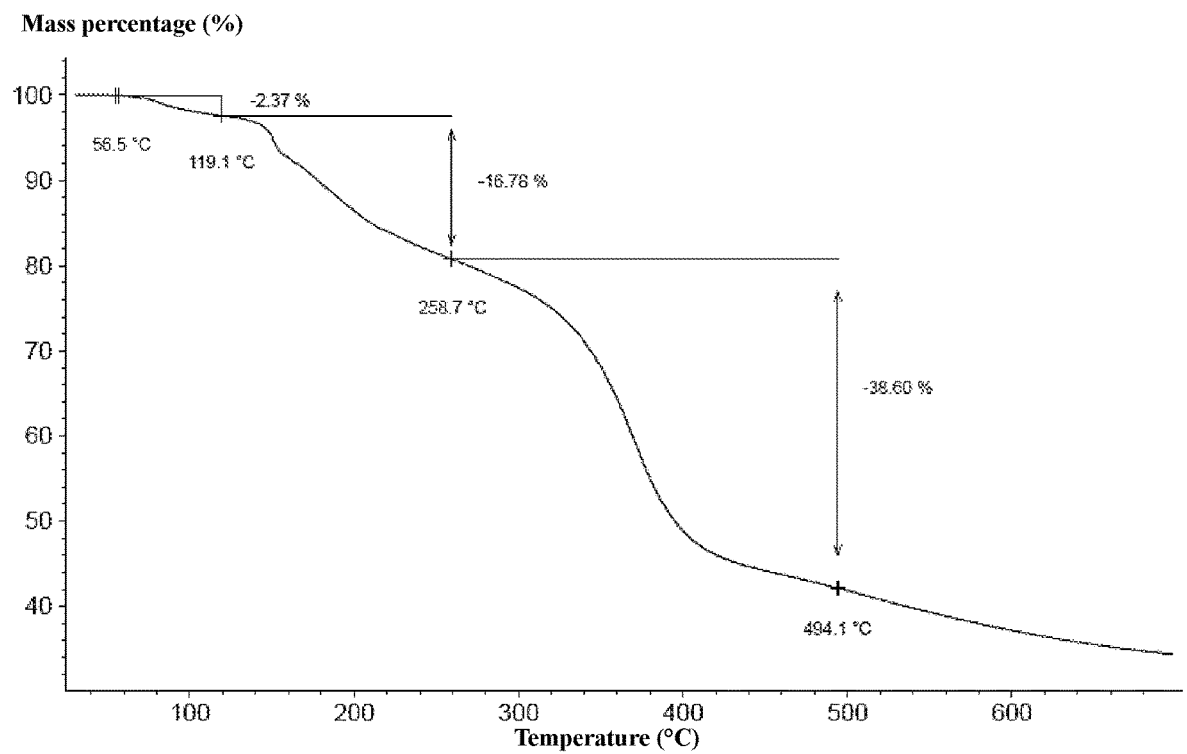
FIG. 5 is a TGA curve of the crystal form A.

Preparation method for the crystal form A: 100 g of the compound of formula (I) was taken and added with 1300 mL of absolute methanol, followed by the addition of 160 mL of 6 mol/L hydrochloric acid, and the mixture was stirred until the compound was dissolved. The mixture was added with 10 g of activated carbon for decolorization for 10 min and filtered, and the filtrate was collected, and concentrated to about 380 g of a liquid. The liquid was heated until it was clarified, naturally cooled for crystallization at 0° C., and filtered, and the filter cake was dried under reduced pressure at 50° C. for more than 4 h to give the product, which was determined to be the crystal form A by XRPD and had a water content of 5.8%, with the XRPD pattern shown in FIG. 3, the DSC pattern shown in FIG. 4, and the TGA curve shown in FIG. 5. The obtained product had a hydrochloric acid content of 7.7%.

Figure 6:
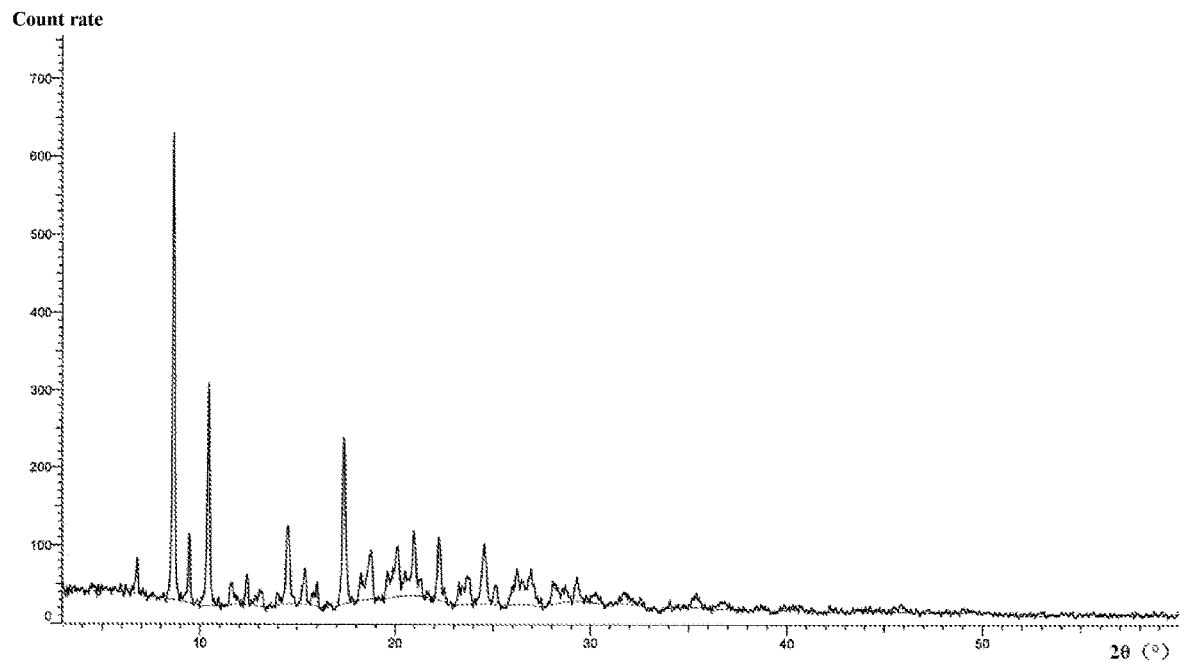
FIG. 6 is an XRPD pattern of the crystal form B.

Preparation method for the crystal form B: the crystal form A was left to stand at 60±2° C. for 30 days to give the product, which was determined to be the crystal B by XRPD and had a water content 4.6%, with the XRPD pattern shown in FIG. 6.

Figure 7:
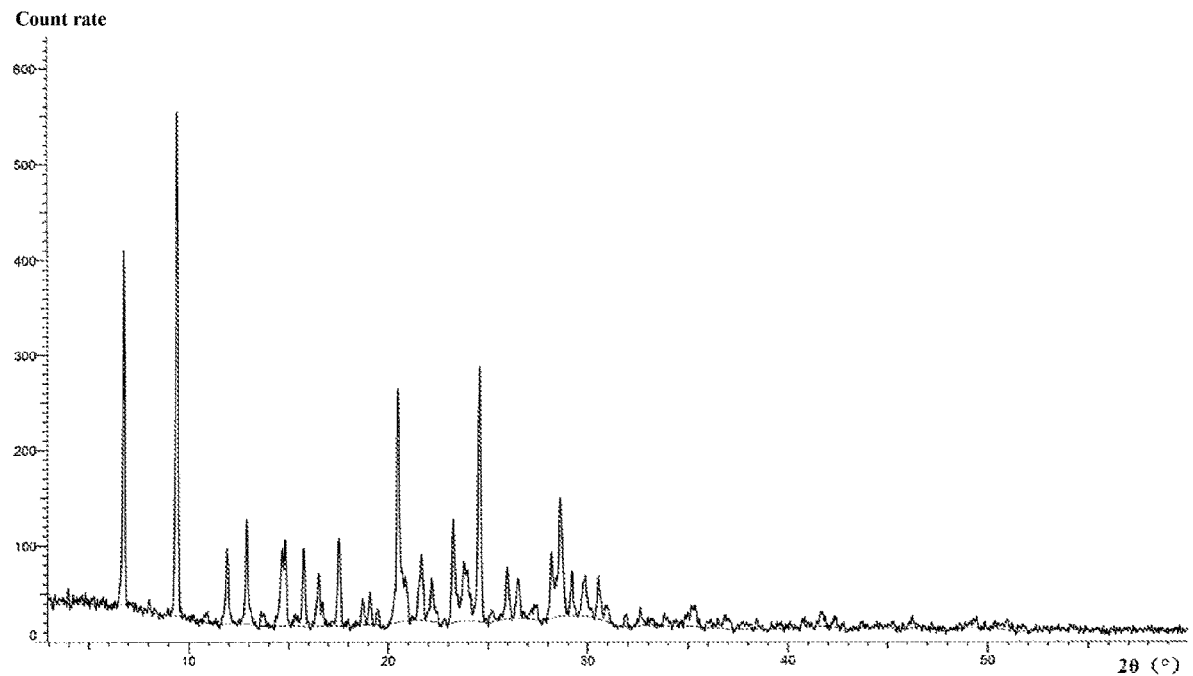
FIG. 7 is an XRPD pattern of the crystal form C.

Preparation method for the crystal form C: the crystal form A was left to stand for 30 days at room temperature with the relative humidity of 92.5%±5% to give the product, which was determined to be the crystal C by XRPD and had a water content of 11.9%, with the XRPD pattern shown in FIG. 7.

Example 4

Figure 9:
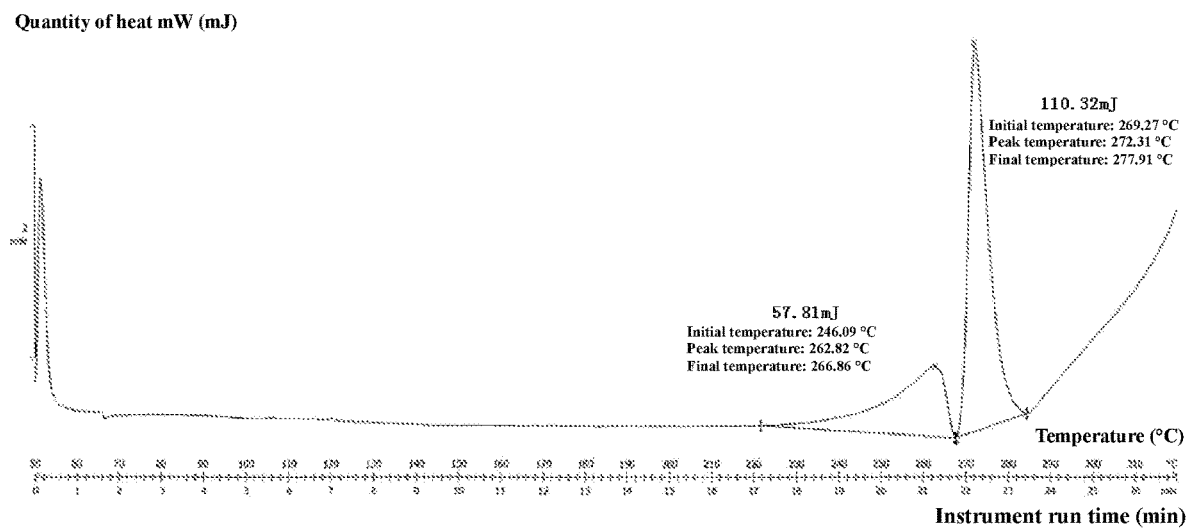
FIG. 9 is a DSC pattern of the crystal form D.
Figure 10:
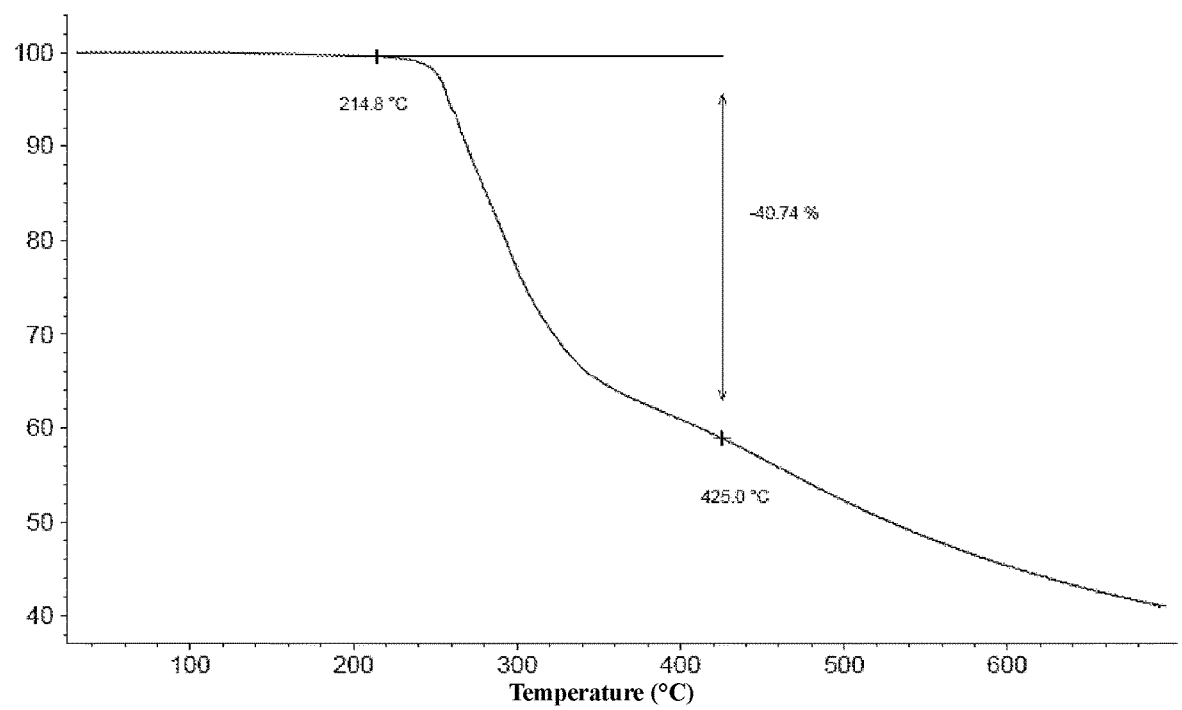
FIG. 10 is a TGA curve of the crystal form D.

Preparation Method for Crystal Form of Sulfate Salt 12 g of the compound of formula (I) was taken and added with 100 mL of methanol until it was uniformly dispersed, followed by the addition of 2.2 mL of 3 mol/L sulfuric acid/methanol solution, and the mixture was stirred at room temperature for 3 h, then filtered. And the filter cake was collected, and dried under reduced pressure at 50° C. for more than 4 h to give the product, which was determined to be the crystal form D by XRPD, with the XRPD pattern shown in FIG. 8, the DSC pattern shown in FIG. 9, and the TGA curve shown in FIG. 10. The obtained product had a sulfuric acid content of 18.3%.

Example 5

Preparation Method for Crystal Form of Phosphate Salt

Method I 0.4 g of the compound of formula (I) was taken and added with 4 mL of acetonitrile, and the mixture was added with 0.22 g of 85% phosphoric acid at room temperature, heated to 70° C. and stirred for 0.5 h. The mixture was naturally cooled to room temperature and filtered, and the filter cake was dried under reduced pressure at 50° C. for 4 h to give the product, which was determined to be the crystal form E by XRPD.

Figure 12:
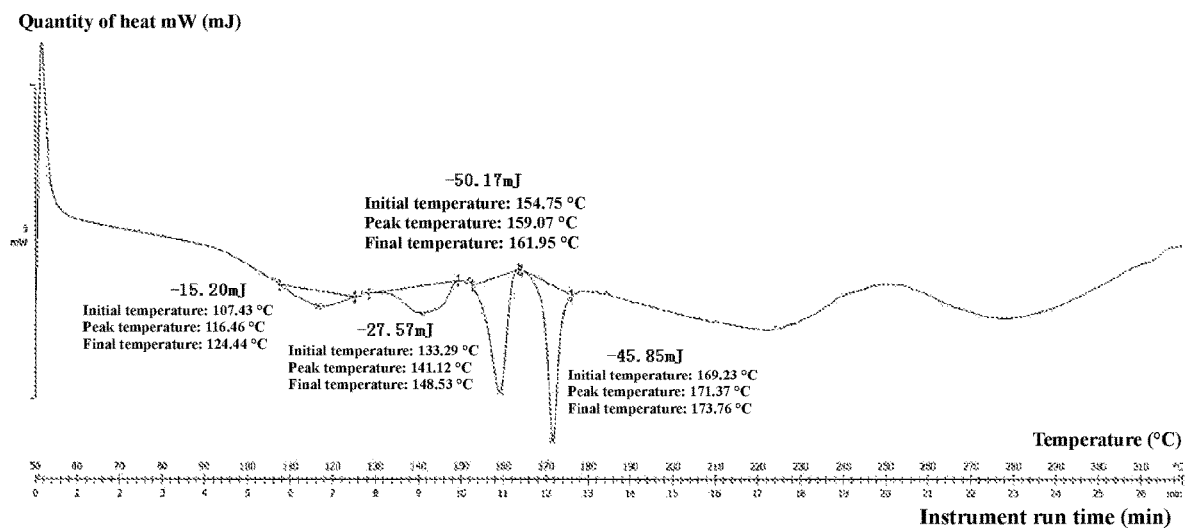
FIG. 12 is a DSC pattern of the crystal form E.
Figure 13:
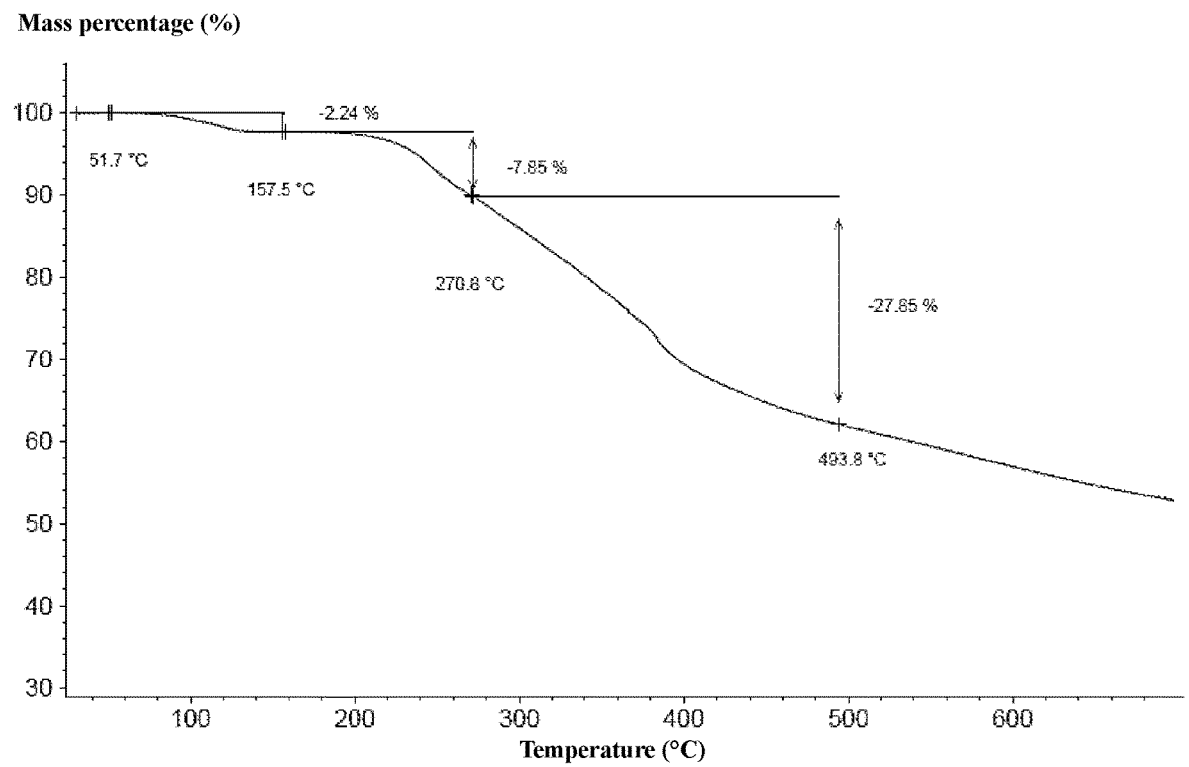
FIG. 13 is a TGA curve of the crystal form E.

Method II 3.5 g of the compound of formula (I) was taken and added with 35 mL of acetonitrile, and the mixture was heated to 70° C., added with 4.5 g of 85% phosphoric acid, and stirred for 2 h with the temperature maintained. The mixture was cooled to room temperature and filtered, and the filter cake was collected, and dried under reduced pressure at 60° C. for 6 h to give the product, which was determined to be the crystal form E by XRPD, with the XRPD pattern shown in FIG. 11, the DSC pattern shown in FIG. 12, and the TGA curve shown in FIG. 13.

Example 6

Figure 15:
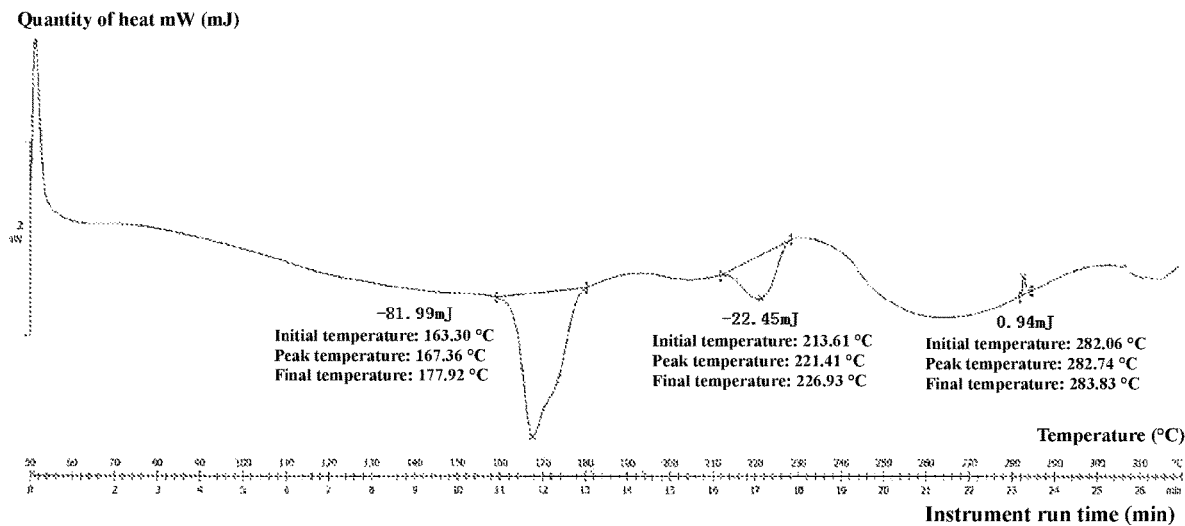
FIG. 15 is a DSC pattern of the crystal form F.
Figure 16:
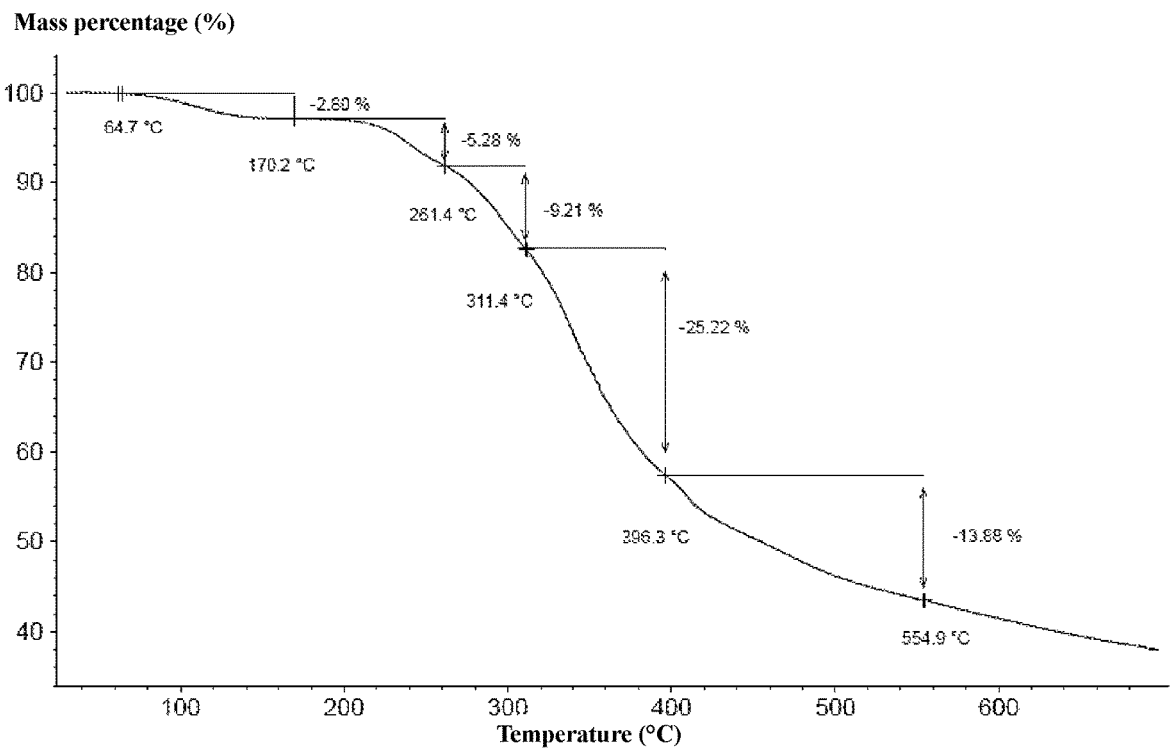
FIG. 16 is a TGA curve of the crystal form F.

Preparation Method for Crystal Form of Mesylate Salt 3.5 g of the compound of formula (I) was taken and added with 17.5 g of acetonitrile, and the mixture was heated to 70° C., added with 1.89 g of methanesulfonic acid, and stirred for 0.5 h with the temperature maintained. The mixture was slowly cooled to room temperature, stirred for 2 h in an ice bath and filtered, and the filter cake was collected, and dried under reduced pressure at 60° C. for 6.5 h to give the product, which was determined to be the crystal form F by XRPD, with the XRPD pattern shown in FIG. 14, the DSC pattern shown in FIG. 15, and the TGA curve shown in FIG. 16. The obtained product had a methanesulfonic acid content of 17.9%.

Experimental Example 1

Study on Stability Under Influencing Factors

In order to evaluate the solid stability of the crystal forms of the present application, the stability of each of the crystal form I, the crystal form A, the crystal form D, the crystal form E and the crystal form F under influencing factors (high temperature, high humidity and light) was investigated. Each of the crystal forms was stored under the high temperature condition (60±2° C., open (weighing bottle)), and the high humidity condition (room temperature, 92.5%±5% RH, open (weighing bottle) and packaged) for 5 days, 10 days and 30 days, and under the ICH light condition (5500 Lux, 0.9 w/m², closed (weighing bottle) and packaged) for 5 days and 10 days. The inner packaging material of the packaged sample was a medical low-density polyethylene bag, and the outer packaging material is a medical polyester/aluminum/polyethylene composite bag. The samples after the storage were characterized by properties, purity (HPLC), crystal form (XRD) and water content to detect the changes in the crystal form and purity. The results are shown in Tables 8-12 ("#" indicates the ICH condition).

TABLE 8

Results of the study on stability of the crystal form I under influencing factors

| Experimental condition | Sampling condition | Crystal form change | Impurity content (%) | Water content (%) |
|---|---|---|---|---|
| Starting crystal form I | / | — | 1.20 | 0.39 |
| 60° C. | 5 days | — | 1.23 | — |
|  | 10 days | Unchanged | 1.21 | 0.19 |
|  | 30 days | Unchanged | 1.31 | 0.15 |
| 92.5% RH | 5 days | — | 1.23 | — |
|  | 10 days | Unchanged | 1.23 | 0.36 |
|  | 30 days | Unchanged | 1.30 | 0.31 |
| 92.5% RH, packaged | 30 days | Unchanged | 1.32 | 0.23 |
| Light# | 5 days | — | 1.18 | — |
|  | 10 days | Unchanged | 1.21 | 0.34 |
| Light#, packaged | 10 days | Unchanged | 1.21 | 0.30. |

TABLE 9

Results of the study on stability of the crystal form A under influencing factors

| Experimental condition | Sampling condition | Crystal form change | Impurity content (%) | Water content (%) |
|---|---|---|---|---|
| Starting crystal form A | / | — | 1.30 | 5.8 |
| Light# | 5 days | — | 1.32 | — |
|  | 10 days | Unchanged | 1.35 | 8.1 |
| Light#, packaged | 10 days | Unchanged | 1.32 | 6.6. |

TABLE 10

Results of the study on stability of the crystal form D under influencing factors

| Experimental condition | Sampling condition | Crystal form change | Impurity content (%) | Water content (%) |
|---|---|---|---|---|
| Starting crystal form D | / | — | 0.05 | 1.4 |
| 60° C. | 5 days | — | 0.19 | — |
|  | 10 days | Unchanged | 0.27 | 1.0 |
|  | 30 days | Unchanged | 0.44 | 0.68 |
| 92.5% RH | 5 days | — | 0.07 | — |
|  | 10 days | Unchanged | 0.06 | 2.0 |
|  | 30 days | Unchanged | 0.07 | 1.9 |
| 92.5% RH, packaged | 30 days | Unchanged | 0.12 | 1.0 |
| Light# | 5 days | — | 0.11 | — |
|  | 10 days | Unchanged | 0.09 | 1.1 |
| Light#, packaged | 10 days | Unchanged | 0.08 | 1.2. |

TABLE 11

Results of the study on stability of the crystal form E under influencing factors

| Experimental condition | Sampling condition | Crystal form change | Impurity content (%) |
|---|---|---|---|
| Starting crystal form E | / | — | 0.18 |
| 60° C. | 5 days | — | 0.20 |
|  | 10 days | Unchanged | 0.21 |
|  | 30 days | Unchanged | 0.21. |

TABLE 12

Results of the study on stability of the crystal form F under influencing factors

| Experimental condition | Sampling condition | Crystal form change | Impurity content (%) |
|---|---|---|---|
| Starting crystal form F | / | — | 0.17 |
| 60° C. | 5 days | — | 0.18 |
|  | 10 days | Unchanged | 0.20 |
|  | 30 days | Unchanged | 0.22. |

Conclusion: the crystal forms of the present application have good stability and high druggability.

Experimental Example 2

Study on Stability of the Crystal Form I

1. Study on Stability Under Influencing Factors

In order to evaluate the solid stability of the crystal form I of the present application, the stability of the crystal form I under influencing factors (high temperature, high humidity and light) was investigated. The crystal form I was stored under the high temperature condition (40° C., open (weighing bottle)), the high temperature condition (60° C., open (weighing bottle)), the high humidity condition (room temperature, 75% RH, open (weighing bottle)) and the high humidity condition (room temperature, 92.5% RH, open (weighing bottle) and packaged) for 5 days, 10 days and 30 days, and under the ICH light condition (5500 Lux, 0.9 w/m², open (weighing bottle) and packaged) for 5 days and 10 days. The inner packaging material of the packaged sample was a double-layer low-density polyethylene bag, and the outer packaging material is a polyester/aluminum/polyethylene composite bag for medicine packaging. The samples after the storage were determined for properties, related substances (HPLC), crystal form (XRD), water content and content to investigate the influence of high temperature, high humidity and light conditions on the product. The results are shown in Table 13 ("#" indicates the ICH condition).

TABLE 13

Results of the study on stability of the crystal form I under influencing factors

| Experimental condition | Sampling condition | Crystal form change | Impurity content (%) | Water content (%) |
|---|---|---|---|---|
| Starting crystal form I | / | — | 0.05 | 0.02 |
| 40° C. | 5 days | Unchanged | 0.06 | 0.02 |
|  | 10 days | Unchanged | 0.08 | 0.01 |
|  | 30 days | Unchanged | 0.08 | 0.02 |
| 60° C. | 5 days | Unchanged | 0.07 | 0.01 |
|  | 10 days | Unchanged | 0.08 | 0.01 |
|  | 30 days | Unchanged | 0.09 | 0.02 |
| 75% RH | 5 days | Unchanged | 0.06 | 0.02 |
|  | 10 days | Unchanged | 0.08 | 0.03 |
|  | 30 days | Unchanged | 0.08 | 0.04 |
| 92.5% RH | 5 days | Unchanged | 0.06 | 0.03 |
|  | 10 days | Unchanged | 0.08 | 0.03 |
|  | 30 days | Unchanged | 0.08 | 0.06 |
| 92.5% RH, packaged | 5 days | Unchanged | 0.06 | 0.02 |
|  | 10 days | Unchanged | 0.08 | 0.01 |
|  | 30 days | Unchanged | 0.08 | 0.03 |
| Light[#] | 5 days | Unchanged | 0.06 | 0.01 |
|  | 10 days | Unchanged | 0.08 | 0.02 |
| Light[#], packaged | 5 days | Unchanged | 0.06 | 0.02 |
|  | 10 days | Unchanged | 0.08 | 0.02. |

2. Study on Accelerated Stability and Long-Term Stability

The crystal form I was placed under the accelerated condition (40±2° C., 75%±5% RH, and packaged) for 1, 2, 3 and 6 months, and under the long-term condition (25±2° C., 65%±5% RH, and packaged) for 3, 6, 9, 12, 18, 24 and 36 months to investigate its acceleration and long-term stability. The inner packaging material of the packaged sample was a double-layer low-density polyethylene bag, and the outer packaging material is a polyester/aluminum/polyethylene composite bag for medicine packaging. The samples after the storage were determined for properties, related substances (HPLC), crystal form (XRD), water content and content to investigate the stability of the product.

TABLE 14

Results of the study on accelerated stability and long-term stability of the crystal form I

| Experimental condition | Sampling condition | Crystal form change | Impurity content (%) | Water content (%) |
|---|---|---|---|---|
| Starting crystal form I | / | — | 0.05 | 0.02 |
| 40° C. ± 2° C., 75% ± 5% RH | 1 month | Unchanged | 0.08 | 0.03 |
|  | 2 months | Unchanged | 0.08 | 0.03 |
|  | 3 months | Unchanged | 0.08 | 0.03 |
|  | 6 months | Unchanged | 0.08 | 0.03 |
| 25° C. ± 2° C., 60% ± 5% RH | 3 months | Unchanged | 0.08 | 0.03 |
|  | 6 months | Unchanged | 0.08 | 0.04. |

Conclusion: the crystal form I of the present application has good stability and high druggability.

Experimental Example 3

Biological Activity Assay

1. In Vitro Enzymatic Activity Assay on BRD4 (BD2)

In the present application, the $IC_{50}$ value of the compound of formula (I) in inhibiting BRD4 (BD2) enzyme binding reaction were determined by homogeneous time resolved fluorescence (HTRF). The compound of formula (I) was serially diluted 5-fold with 100% DMSO starting from 1 mM (7 concentrations in total), and then 2 μL of the compound of formula (I) at each concentration was added to 18 μL of a reaction buffer (20 mM HEPES pH 7.5, 150 mM NaCl, 5 mM DTT, 0.005% Tween 20, and 100 μg/mL BSA) for dilution. After being mixed well, 2 μL of the compound of formula (I) at each concentration was added to 48 μL of the above reaction buffer for dilution, and mixed well (final concentration of the compound of formula (I) in DMSO: 0.1%). 2.5 μL of the resulting mixture was added to a 384-well plate (OptiPlate-384, purchased from PerkinElmer), then 5 μL of GST-BRD4 (BD2, 349-460 aa) (final concentration: 2 nM) was added, and the resulting mixture was centrifuged, and fully mixed. 2.5 μL of a peptide Biotin-AHA-SGRGK(Ac)GGK(Ac)GLGK(Ac)GGAK(Ac) RHRKV (final concentration: 200 nM) was then added to initiate the reaction (total reaction volume: 10 μL). The 384-well plate was placed in an incubator at 23° C. to react for 1 hour, and then 5 μL of Eu3+ cryptate-labeled anti-GST antibody (purchased from Cisbio) and 5 μL of Streptavidin-XL-665 (purchased from Cisbio) were added to terminate the reaction. After being incubated in the incubator for another 1 hour, the fluorescence values (excited at 320 nm, emitted light at 665 nm and 620 nm being detected, and the ratio of the two being the enzyme binding signal) were read on Envision (purchased from PerkinElmer). The binding strength of the compound of formula (I) to BRD4 (BD2) protein was determined respectively at 7 concentrations, and the data were calculated using GraphPad Prism software to obtain the $IC_{50}$ value of the compound of formula (I).

2. In Vitro Enzymatic Activity Assay on BRD4 (BD1)

In the present application, the $IC_{50}$ value of the compound of formula (I) in inhibiting BRD4 (BD1) enzyme binding reaction were determined by homogeneous time resolved fluorescence (HTRF). The compound of formula (I) was serially diluted 5-fold with 100% DMSO starting from 0.2 mM (7 concentrations in total), and then 2 μL of the compound of formula (I) at each concentration was added to 48 μL of a reaction buffer (20 mM HEPES pH 7.5, 150 mM NaCl, 5 mM DTT, 0.005% Tween 20, and 100 μg/mL BSA) for dilution, and mixed well. 2.5 μL of the resulting mixture was added to a 384-well plate (OptiPlate-384, purchased from PerkinElmer), then 5 μL of GST-BRD4 (BD1, 44-168 aa) (final concentration: 1 nM) was added, and the resulting mixture was centrifuged, and fully mixed. 2.5 μL of a short peptide Biotin-AHA-SGRGK(Ac)GGK(Ac)GLGK(Ac) GGAK(Ac) RHRKV (final concentration: 100 nM) was then added to initiate the reaction (total reaction volume: 10 μL). The 384-well plate was placed in an incubator at 23° C. to react for 1 hour, and then 5 μL of Eu3+ cryptate-labled anti-GST antibody (purchased from Cisbio) and 5 μL of Streptavidin-XL-665 (purchased from Cisbio) were added to terminate the reaction. After being incubated in the incubator for another 1 hour, the fluorescence values (excited at 320 nm, emitted light at 665 nm and 620 nm being detected, and the ratio of the two being the enzyme binding signal) were read on Envision (purchased from PerkinElmer). The binding strength of the compound of formula (I) to BRD4 (BD1) protein was determined respectively at 7 concentrations, and the data were calculated using GraphPad Prism software to obtain the $IC_{50}$ value of the compound of formula (I).

The test results are shown in Table 15.

TABLE 15

Results of in vitro enzymatic activity

| Compound | BRD4-BD1 $IC_{50}$ (nM) | BRD4-BD2 $IC_{50}$ (nM) |
|---|---|---|
| Compound of formula (I) | 0.64 | 0.25 |

3. MV4-11 Cell Proliferation Activity Assay

Human acute lymphoblastic leukemia cell line MV4-11 cells were cultured in PRIM1640 medium plus 10% fetal bovine serum (FBS, purchased from Biological Industries, Be and 1% penicillin/streptomycin double antibody (P/S, purchased from Life Technology) at 37° C. with 5% $CO_2$. On the day before the test of the compound of formula (I), MV4-11 cells were spread in a 96-well plate (purchased from Corning) at a concentration of 8000 cells/195 μL/well. After 24 hours, the compound of formula (I) was serially diluted 4-fold with 100% DMSO starting from 10 mM (9 concentrations in total), and then 2 μL of the compound of formula (I) at each concentration was added to 48 μL of PRIM1640 medium for dilution. 5 μL of the diluted compound of formula (I) at each concentration was added to the wells spread with the cell suspension, and the compound of formula (I) and cells were co-incubated in a cell incubator for 72 hours (3 days). Then the mixture was added with 35 μL of Cell-Titer Blue reagent (purchased from Promega) and incubated for another 4 hours. The fluorescence values (excited at 560 nm, detected at 590 nm) were then read on Flexstation III, and the data were calculated using GraphPad Prism software to obtain the $IC_{50}$ value of the compound of formula (I) for inhibition of cell proliferation.

4. Kasumi-1 Cell Proliferation Activity Assay

Human acute myeloblastic leukemia cell line Kasumi-1 cells were cultured in PRIM1640 medium plus 20% fetal bovine serum (FBS, purchased from Biological Industries, Be and 1% penicillin/streptomycin double antibody (P/S, purchased from Life Technology) at 37° C. with 5% $CO_2$. On the day before the test of the compound of formula (I), Kasumi-1 cells were spread in a 96-well plate (purchased from Corning) at a concentration of 5000 cells/195 μL/well. After 24 hours, the compound of formula (I) was serially diluted 4-fold with 100% DMSO starting from 10 mM (9 concentrations in total), and then 2 μL of the compound of formula (I) at each concentration was added to 48 μL of PRIM1640 medium for dilution. 5 μL of the diluted compound of formula (I) at each concentration was added to the wells spread with the cell suspension, and the compound of formula (I) and cells were co-incubated in a cell incubator for 72 hours (3 days). Then the mixture was added with 35 μL of Cell-Titer Blue reagent (purchased from Promega) and incubated for another 4 hours. The fluorescence values (excited at 560 nm, detected at 590 nm) were then read on Flexstation III, and the data were calculated using GraphPad Prism software to obtain the $IC_{50}$ value of the compound of formula (I) for inhibition of cell proliferation. The test results are shown in Table 16.

TABLE 16

Results of in vitro cytological activity

| Compound | MV4-11 $IC_{50}$ (nM) | Kasumi-1 $IC_{50}$ (nM) |
|---|---|---|
| Compound of formula (I) | 3.14 | 1.56 |

5. Animal Pharmacokinetic Study

Three healthy adult male rats that obtained from Beijing Vital River Laboratory Animal Technology Co., Ltd were used for the animal pharmacokinetic experiment. The compound of formula (I) was suspended in 2% absolute ethanol, 5% tween 80, 20% polyethylene glycol 400, and 73% (5% hydroxypropylmethyl cellulose in water) (V/V/V/V) at a concentration of 1 mg/mL. The administration volume was 5 mL/kg, and animals were treated with a single intragastric administration at a dose of 5 mg/kg Animals were fasted overnight prior to the experiment, and the fasting time was from 10 hours before administration to 4 hours after administration. Blood was sampled at 0.25, 0.5, 1, 2, 4, 6, 8 and 24 hours after administration Animals were lightly anesthetized with isoflurane, and approximately 0.4 mL of whole blood was collected from the orbital venous plexus using a glass blood collection tube, and placed in a heparin anticoagulation tube. The sample was centrifuged at 4200 rpm for 5 minutes at 4° C., and then the plasma was transferred to a centrifuge tube and stored at −80° C. until analyzed. In the plasma sample analysis, test compound and internal standard (warfarin or propranolol) were extracted from rat plasma by acetonitrile protein precipitation, and the extracts were analyzed by LC/MS/MS. The measured plasma concentration-time data of the individual animals were analyzed using a non-compartmental model of WinNonlin (version no. 5.2.1; Pharsight) software to give pharmacokinetic parameters as shown in Table 17 below: the maximum (peak) plasma drug concentration $C_{max}$; the time to peak $T_{max}$; the half-life $T_{1/2}$ and the area under the plasma concentration-time curve extrapolated to infinity $AUC_{0-inf}$.

TABLE 17

Results of the study on pharmacokinetic parameters

| Parameters | Unit | Compound of formula (I) |
|---|---|---|
| $t_{1/2}$ | hr | 5.25 |
| $T_{max}$ | hr | 2.67 |
| $C_{max}$ | ng/mL | 372 |
| $AUC_{0-inf}$ | hr · ng/mL | 3466 |

It can be seen that the compound of formula (I) has good activity and good pharmacokinetic properties.

Experimental Example 4

Particle Size Distribution Test

After jet milling, the crystal form I was tested for the particle size distribution by referring to Method 3 (a light scattering method) of Determination of Particle Size and Distribution of General Chapter 0982, *Chinese Pharmacopoeia*, Volume IV, 2020 Edition, with the specific steps as follows: 10 mg of the sample was weighed and placed in a laser scattering particle size distribution analyzer for testing (trigger conditions: 10 s, 1%; dispersion pressure: 2.0 bar). The results are shown in Table 18.

TABLE 18

| Results of particle size distribution test | | |
|---|---|---|
| Milling pressure | Experiment No. | $X_{90}$ (μm) |
| 0.1 MPa | 1 | 11.54 |
|  | 2 | 11.46 |
|  | 3 | 11.50 |
|  | Mean | 11.50 |
| 0.3 MPa | 1 | 5.67 |
|  | 2 | 5.78 |
|  | 3 | 6.02 |
|  | Mean | 5.82 |

The invention claimed is:

1. A crystal form of a compound of formula (I), a pharmaceutically acceptable salt of a compound of formula (I) or a crystal form thereof:

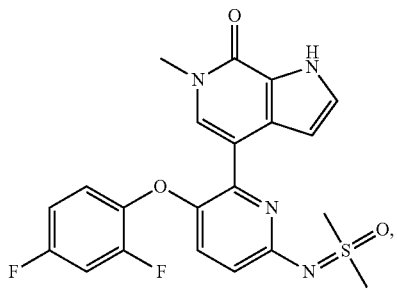

(I)

wherein the crystal form is selected from the group consisting of:

a crystal form of the compound of formula (I), wherein the crystal form has characteristic diffraction peaks at the following 2θ:12.4°±0.2°, 14.5°±0.2°, 17.4°±0.2°, 18.5°±0.2°, 20.4°±0.2°, and 24.7°±0.2°, in an X-ray powder diffraction pattern;

a crystal form of a hydrochloride salt of the compound of formula (I), wherein the crystal form has characteristic diffraction peaks at the following 2θ:6.8°±0.2°, 8.4°±0.2°, 9.4°±0.2°, 10.2°±0.2°, and 16.8°±0.2°, in an X-ray powder diffraction pattern;

a crystal form of a hydrochloride salt of the compound of formula (I), wherein the crystal form has characteristic diffraction peaks at the following 2θ:8.7°±0.2°, 9.5°±0.2°, 10.5°±0.2°, 14.5°±0.2°, and 17.4°±0.2°, in an X-ray powder diffraction pattern;

a crystal form of a hydrochloride salt of the compound of formula (I), wherein the crystal form has characteristic diffraction peaks at the following 2θ:6.8°±0.2°, 9.5°±0.2°, 12.9°±0.2°, 20.5°±0.2°, and 24.6°±0.2°, in an X-ray powder diffraction pattern;

a crystal form of a sulfate salt of the compound of formula (I), wherein the crystal form has characteristic diffraction peaks at the following 2θ:13.5°±0.2°, 14.7°±0.2°, 18.6°±0.2°, 21.2°±0.2°, 23.0°±0.2°, and 24.1°±0.2°, in an X-ray powder diffraction pattern;

a crystal form of a phosphate salt of the compound of formula (I), wherein the crystal form has characteristic diffraction peaks at the following 2θ:10.1°±0.2°, 10.5°±0.2°, 19.0°±0.2°, 21.0°±0.2°, 22.7°±0.2°, and 24.0°±0.2°, in an X-ray powder diffraction pattern; and a crystal form of a mesylate salt of the compound of formula (I), wherein the crystal form has characteristic diffraction peaks at the following 2θ:8.8°±0.2°, 10.1°±0.2°, 17.7°±0.2°, 18.0°±0.2°, 24.1°±0.2°, and 24.8°±0.2°, in an X-ray powder diffraction pattern;

and wherein the pharmaceutically acceptable salt of the compound of formula (I) is selected from the group consisting of: a hydrochloride salt of the compound of formula (I), a sulfate salt of the compound of formula (I), a phosphate salt of the compound of formula (I), and a mesylate salt of the compound of formula (I).

2. The crystal form of the compound of formula (I), the pharmaceutically acceptable salt of the compound of formula (I) or the crystal form thereof according to claim 1, wherein the crystal form is the crystal form of the compound of formula (I), the crystal form has characteristic diffraction peaks at the following 2θ:6.6°±0.2°, 9.3°±0.2°, 12.4°±0.2°, 14.5°±0.2°, 16.6°±0.2°, 17.4°±0.2°, 18.5°±0.2°, 20.0°±0.2°, 20.4°±0.2°, and 24.7°±0.2°, in an X-ray powder diffraction pattern;

or, the crystal form has characteristic diffraction peaks at the following 2θ:6.6°±0.2°,

| No. | 2θ (±0.2°) | Relative intensity (%) |
|---|---|---|
| 1 | 6.6 | 20.0 |
| 2 | 9.3 | 16.2 |
| 3 | 12.4 | 63.4 |
| 4 | 14.5 | 100.0 |
| 5 | 14.7 | 27.5 |
| 6 | 15.2 | 10.2 |
| 7 | 16.6 | 21.1 |
| 8 | 17.4 | 32.4 |
| 9 | 18.5 | 99.2 |
| 10 | 20.0 | 25.3 |
| 11 | 20.4 | 45.0 |
| 12 | 21.5 | 20.9 |
| 13 | 21.8 | 8.1 |
| 14 | 22.5 | 21.8 |
| 15 | 23.3 | 8.0 |
| 16 | 23.7 | 26.4 |
| 17 | 24.7 | 36.7 |
| 18 | 25.2 | 26.9 |
| 19 | 26.9 | 11.1 |
| 20 | 29.3 | 15.5 |
| 21 | 29.7 | 14.8 |
| 22 | 30.3 | 12.5 | or, the crystal form has an X-ray powder diffraction (XRPD) pattern with characteristics represented by the XRPD pattern shown in FIG. 1.

3. The crystal form of the compound of formula (I), the pharmaceutically acceptable salt of the compound of formula (I) or the crystal form thereof according to claim 1, wherein the crystal form is a crystal form of the hydrochloride salt of the compound of formula (I); optionally, the crystal form is a hydrate; preferably, the hydrate is selected from the group consisting of a hemihydrate, a monohydrate, a dihydrate, a trihydrate and a tetrahydrate; further preferably, the hydrate is selected from the group consisting of a monohydrate, a dihydrate and a tetrahydrate; and most preferably, the hydrate is selected from the group consisting of a monohydrate and a tetrahydrate.

Figure 3:
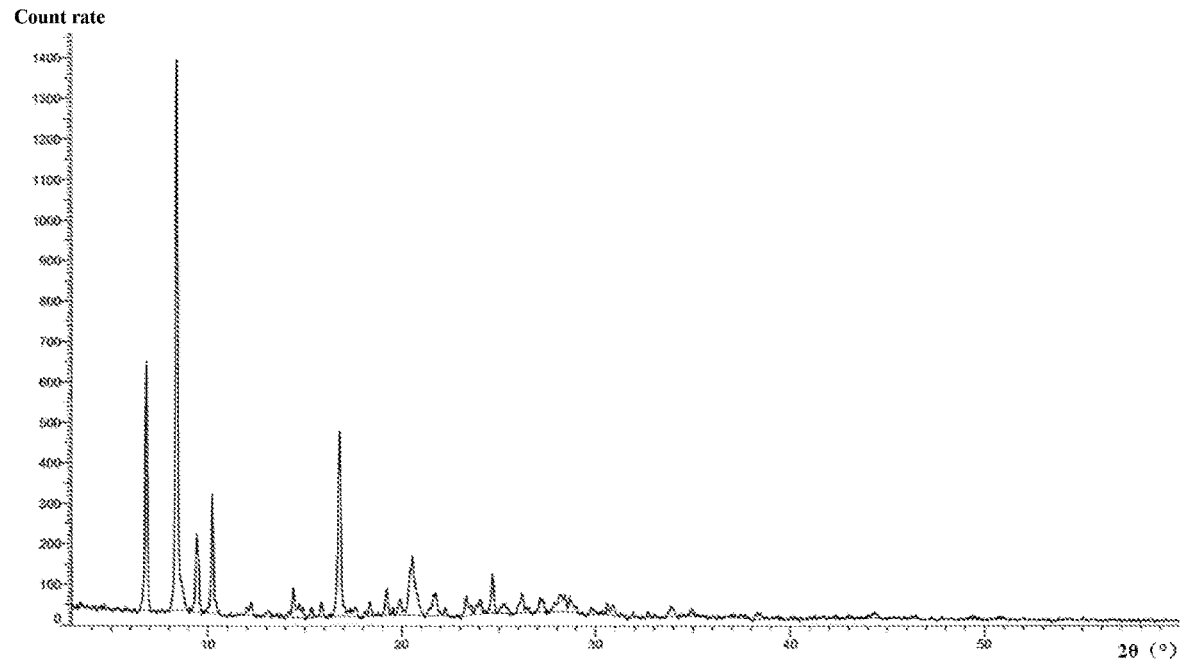
FIG. 3 is an XRPD pattern of the crystal form A.

4. The crystal form of the compound of formula (I), the pharmaceutically acceptable salt of the compound of formula (I) or the crystal form thereof according to claim 3, wherein the crystal form is the crystal form of the hydrochloride salt of the compound of formula (I), the crystal form has characteristic diffraction peaks at the following 2θ: 6.8°±0.2°, 8.4°±0.2°, 9.4°±0.2°, 10.2°±0.2°, 14.4°±0.2°, 16.8°±0.2°, 20.5°±0.2°, and 24.7°±0.2°, in an X-ray powder diffraction pattern;

or, the crystal form has characteristic diffraction peaks at the following 2θ:6.8°±0.2°, 8.4°±0.2°, 9.4°±0.2°, 10.2°±0.2°, 14.4°±0.2°, 16.8°±0.2°, 19.2°±0.2°, 20.5°±0.2°, 21.7°±0.2°, 23.3°±0.2°, and 24.7°±0.2°;

or, the crystal form has the following XRPD pattern analysis data:

| No. | 2θ (±0.2°) | Relative intensity (%) |
|---|---|---|
| 1 | 6.8 | 45.2 |
| 2 | 8.4 | 100.0 |
| 3 | 9.4 | 13.6 |
| 4 | 10.2 | 21.5 |
| 5 | 14.4 | 5.4 |
| 6 | 16.8 | 33.5 |
| 7 | 19.2 | 4.8 |
| 8 | 20.5 | 10.6 |
| 9 | 21.7 | 4.2 |
| 10 | 23.3 | 3.5 |
| 11 | 24.7 | 7.0 |
| 12 | | | or, the crystal form has an X-ray powder diffraction (XRPD) pattern with characteristics represented by the XRPD pattern shown in FIG. 3.

5. The crystal form of the compound of formula (I), the pharmaceutically acceptable salt of the compound of formula (I) or the crystal form thereof according to claim 3,
wherein the crystal form is the crystal form of the hydrochloride salt of the compound of formula (I), wherein the crystal form has characteristic diffraction peaks at the following 2θ:6.8°±0.2°, 8.7°±0.2°, 9.5°±0.2°, 10.5°±0.2°, 14.5°±0.2°, 17.4°±0.2°, 21.0°±0.2°, and 22.2°±0.2°, in an X-ray powder diffraction pattern;
or, the crystal form has characteristic diffraction peaks at the following 2θ:6.8°±0.2°, 8.7°±0.2°, 9.5°±0.2°, 10.5°±0.2°, 14.5°±0.2°, 17.4°±0.2°, 18.8°±0.2°, 20.1°±0.2°, 21.0°±0.2°, 22.2°±0.2°, and 24.6°±0.2°;
or, the crystal form has the following XRPD pattern analysis data:

| No. | 2θ (±0.2°) | Relative intensity (%) |
|---|---|---|
| 1 | 6.8 | 7.8 |
| 2 | 8.7 | 100.0 |
| 3 | 9.5 | 14.9 |
| 4 | 10.5 | 48.3 |
| 5 | 14.5 | 16.6 |
| 6 | 17.4 | 35.9 |
| 7 | 18.8 | 10.4 |
| 8 | 20.1 | 10.6 |
| 9 | 21.0 | 13.9 |
| 10 | 22.2 | 13.3 |
| 11 | 24.6 | 12.7 |
| 12 | | | or, the crystal form has an X-ray powder diffraction (XRPD) pattern with characteristics represented by the XRPD pattern shown in FIG. 6.

6. The crystal form of the compound of formula (I), the pharmaceutically acceptable salt of the compound of formula (I) or the crystal form thereof according to claim 3,
wherein the crystal form is the crystal form of the hydrochloride salt of the compound of formula (I), the crystal form has characteristic diffraction peaks at the following 2θ: 6.8°±0.2°, 9.5°±0.2°, 12.9°±0.2°, 14.8°±0.2°, 17.5°±0.2°, 20.5°±0.2°, 23.3°±0.2°, and 24.6°±0.2°, in an X-ray powder diffraction pattern;
or, the crystal form has characteristic diffraction peaks at the following 2θ:6.8°±0.2°, 9.5°±0.2°, 11.9°±0.2°, 12.9°±0.2°, 14.8°±0.2°, 15.8°±0.2°, 17.5°±0.2°, 20.5°±0.2°, 23.3°±0.2°, 24.6°±0.2°, and 28.7°±0.2°;

or, the crystal form has the following XRPD pattern analysis data:

| No. | 2θ (±0.2°) | Relative intensity (%) |
|---|---|---|
| 1 | 6.8 | 69.1 |
| 2 | 9.5 | 100.0 |
| 3 | 11.9 | 14.6 |
| 4 | 12.9 | 20.2 |
| 5 | 14.8 | 16.7 |
| 6 | 15.8 | 15.7 |
| 7 | 16.5 | 10.5 |
| 8 | 17.5 | 17.2 |
| 9 | 20.5 | 46.3 |
| 10 | 21.7 | 12.8 |
| 11 | 23.3 | 19.9 |
| 12 | 23.9 | 9.9 |
| 13 | 24.6 | 50.5 |
| 14 | 26.0 | 10.2 |
| 15 | 28.2 | 12.6 |
| 16 | 28.7 | 24.0 | or, the crystal form has an X-ray powder diffraction (XRPD) pattern with characteristics represented by the XRPD pattern shown in FIG. 7.

Figure 8:
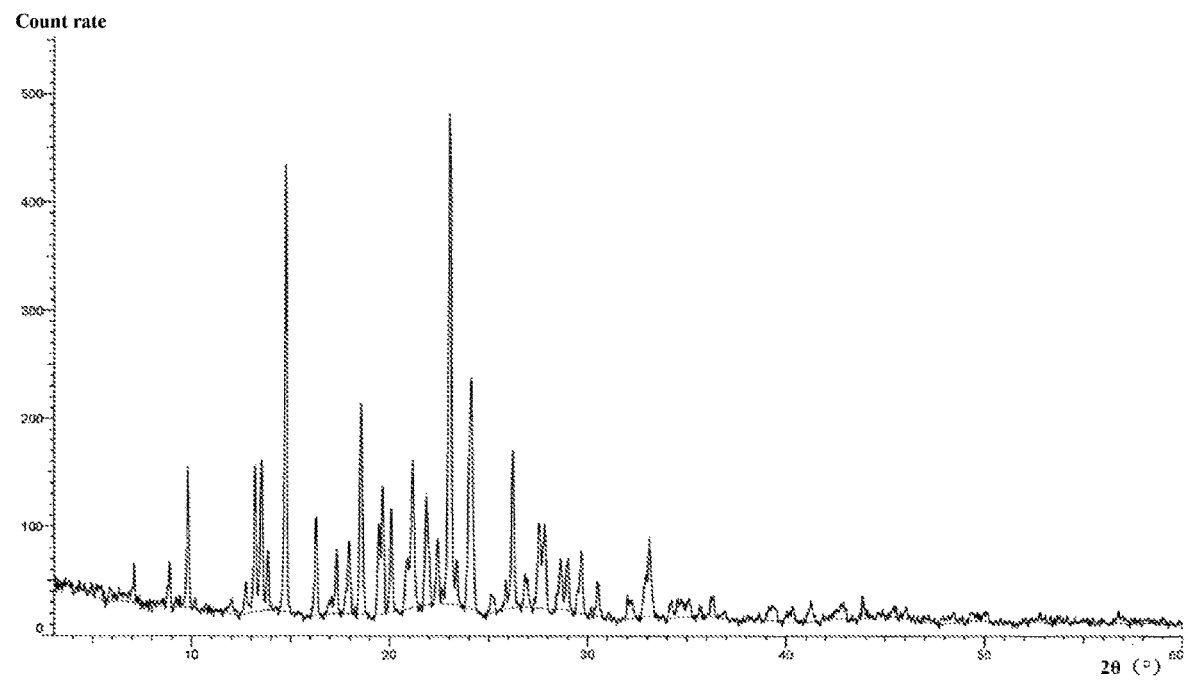
FIG. 8 is an XRPD pattern of the crystal form D.

7. The crystal form of the compound of formula (I), the pharmaceutically acceptable salt of the compound of formula (I) or the crystal form thereof according to claim 1,
wherein the crystal form is the crystal form of the sulfate salt of the compound of formula (I), the crystal form has characteristic diffraction peaks at the following 2θ:7.1°±0.2°, 8.9°±0.2°, 9.8°±0.2°, 13.2°±0.2°, 13.5°±0.2°, 14.7°±0.2°, 18.6°±0.2°, 21.2°±0.2°, 23.0°±0.2°, and 24.1°±0.2°, in an X-ray powder diffraction pattern;
or, the crystal form has characteristic diffraction peaks at the following 2θ:7.1°±0.2°, 8.9°±0.2°, 9.8°±0.2°, 13.2°±0.2°, 13.5°±0.2°, 14.7°±0.2°, 16.3°±0.2°, 18.6°±0.2°, 19.7°±0.2°, 21.2°±0.2°, 21.9°±0.2°, 23.0°±0.2°, 24.1°±0.2°, and 26.2°±0.2°;
or, the crystal form has the following XRPD pattern analysis data:

| No. | 2θ (±0.2°) | Relative intensity (%) |
|---|---|---|
| 1 | 7.1 | 7.8 |
| 2 | 8.9 | 8.7 |
| 3 | 9.8 | 28.1 |
| 4 | 13.2 | 29.4 |
| 5 | 13.5 | 30.4 |
| 6 | 13.8 | 12.3 |
| 7 | 14.7 | 90.8 |
| 8 | 16.3 | 19.7 |
| 9 | 17.3 | 12.9 |
| 10 | 18.0 | 14.6 |
| 11 | 18.6 | 42.9 |
| 12 | 19.7 | 25.8 |
| 13 | 20.1 | 20.9 |
| 14 | 20.9 | 10.1 |
| 15 | 21.2 | 29.8 |
| 16 | 21.9 | 22.5 |
| 17 | 22.4 | 13.0 |
| 18 | 23.0 | 100.0 |
| 19 | 24.1 | 46.2 |
| 20 | 26.2 | 31.9 |
| 21 | 27.5 | 17.2 |
| 22 | 27.8 | 17.1 |
| 23 | 28.6 | 10.2 |
| 24 | 29.7 | 12.7 |
| 25 | 33.1 | 16.1 | or, the crystal form has an X-ray powder diffraction (XRPD) pattern with characteristics represented by the XRPD pattern shown in FIG. 8.

Figure 11:
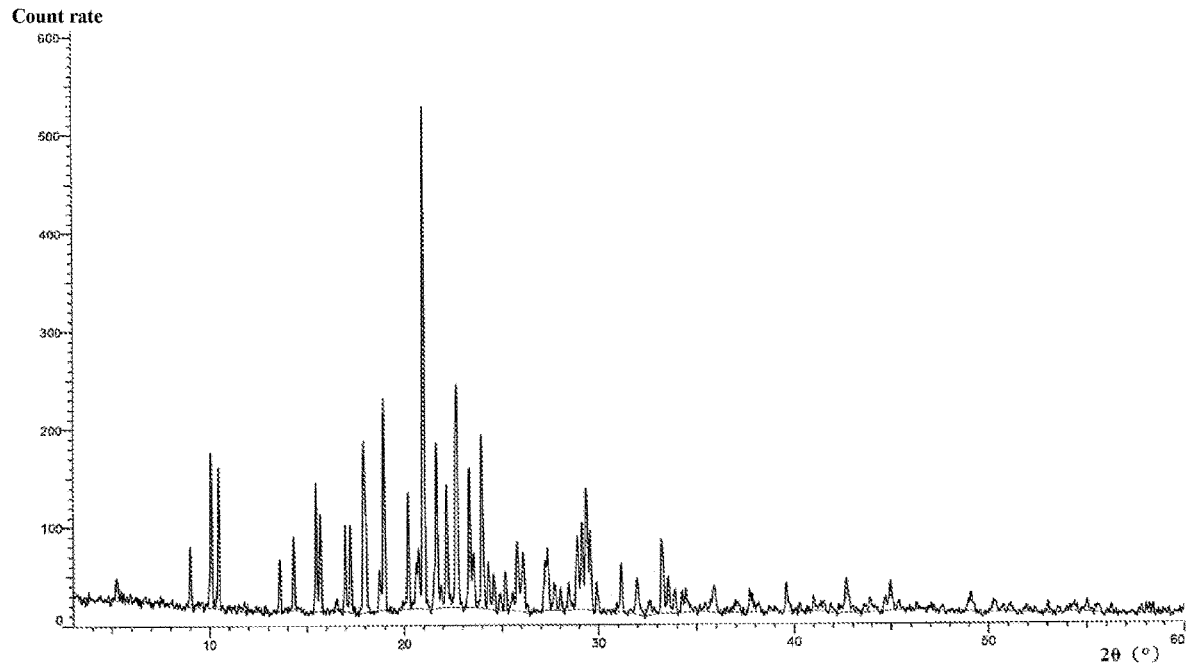
FIG. 11 is an XRPD pattern of the crystal form E.

8. The crystal form of the compound of formula (I), the pharmaceutically acceptable salt of the compound of formula (I) or the crystal form thereof according to claim 1, wherein the crystal form is the crystal form of the phosphate salt of the compound of formula (I), the crystal form has characteristic diffraction peaks at the following 2θ: 9.0°±0.2°, 10.1°±0.2°, 10.5°±0.2°, 17.9°±0.2°, 19.0°±0.2°, 21.0°±0.2°, 21.7°±0.2°, 22.7°±0.2°, and 24.0°±0.2°, in an X-ray powder diffraction pattern;

or, the crystal form has characteristic diffraction peaks at the following 2θ:5.2°±0.2°, 9.0°±0.2°, 10.1°±0.2°, 10.5°±0.2°, 15.5°±0.2°, 17.9°±0.2°, 19.0°±0.2°, 20.2°±0.2°, 21.0°±0.2°, 21.7°±0.2°, 22.2°±0.2°, 22.7°±0.2°, 23.4°±0.2°, and 24.0°±0.2°;

or, the crystal form has the following XRPD pattern analysis data:

| No. | 2θ (±0.2°) | Relative intensity (%) |
|---|---|---|
| 1 | 5.2 | 4.2 |
| 2 | 9.0 | 12.3 |
| 3 | 10.1 | 32.7 |
| 4 | 10.5 | 30.9 |
| 5 | 13.6 | 10.2 |
| 6 | 14.3 | 14.3 |
| 7 | 15.5 | 25.0 |
| 8 | 15.7 | 20.5 |
| 9 | 17.0 | 18.6 |
| 10 | 17.3 | 16.4 |
| 11 | 18.0 | 30.1 |
| 12 | 19.0 | 37.6 |
| 13 | 20.2 | 22.9 |
| 14 | 21.0 | 100.0 |
| 15 | 21.7 | 31.8 |
| 16 | 22.2 | 24.3 |
| 17 | 22.7 | 40.6 |
| 18 | 23.4 | 29.7 |
| 19 | 24.0 | 32.1 |
| 20 | 25.8 | 10.7 |
| 21 | 26.1 | 12.2 |
| 22 | 27.4 | 11.7 |
| 23 | 28.9 | 13.8 |
| 24 | 29.2 | 15.7 |
| 25 | 29.4 | 14.2 |
| 26 | 29.6 | 16.0 |
| 27 | 33.3 | 13.3 | or, the crystal form has an X-ray powder diffraction (XRPD) pattern with characteristics represented by the XRPD pattern shown in FIG. 11.

Figure 14:
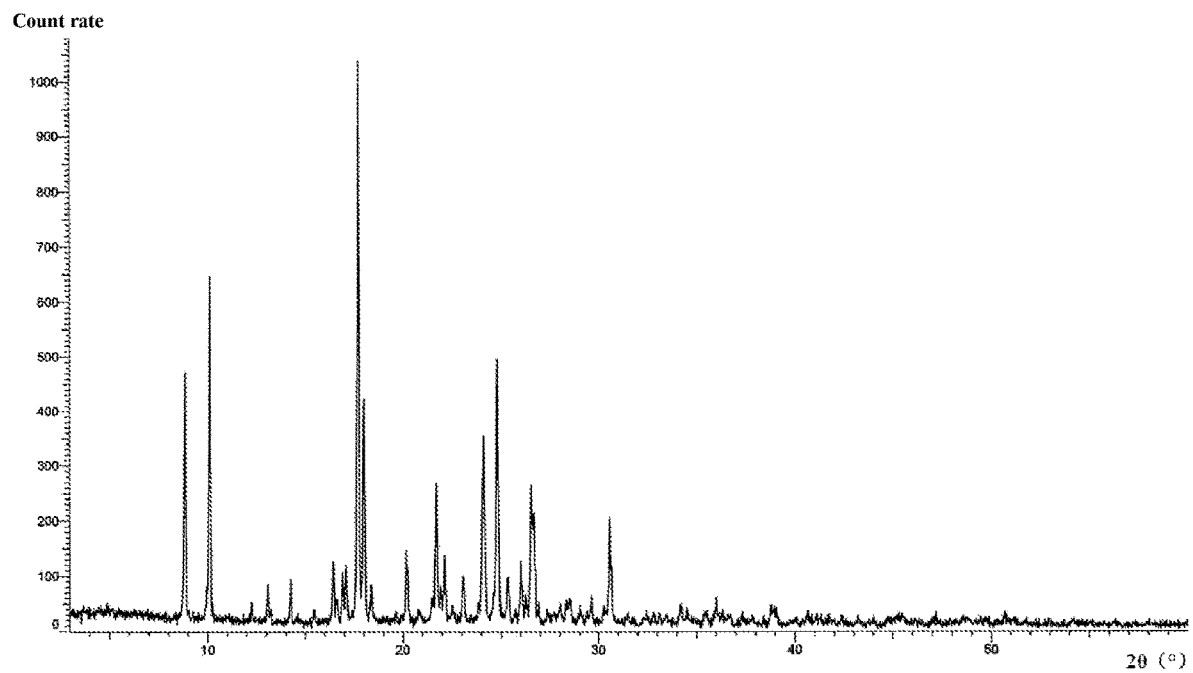
FIG. 14 is an XRPD pattern of the crystal form F.

9. The crystal form of the compound of formula (I), the pharmaceutically acceptable salt of the compound of formula (I) or the crystal form thereof according to claim 1, wherein the crystal form is the crystal form of the mesylate salt of the compound of formula (I), the crystal form has characteristic diffraction peaks at the following 2θ:8.8°±0.2°, 10.1°±0.2°, 16.4°±0.2°, 17.7°±0.2°, 18.0°±0.2°, 21.7°±0.2°, 22.1°±0.2°, 24.1°±0.2°, 24.8°±0.2°, and 26.6°±0.2°, in an X-ray powder diffraction pattern;

or, the crystal form has characteristic diffraction peaks at the following 2θ:8.8°±0.2°, 10.1°±0.2°, 13.1°±0.2°, 14.3°±0.2°, 16.4°±0.2°, 17.7°±0.2°, 18.0°±0.2°, 20.2°±0.2°, 21.7°±0.2°, 22.1°±0.2°, 24.1°±0.2°, 24.8°±0.2°, 26.0°±0.2°, and 26.6°±0.2°;

or, the crystal form has the following XRPD pattern analysis data:

| No. | 2θ (±0.2°) | Relative intensity (%) |
|---|---|---|
| 1 | 8.8 | 42.5 |
| 2 | 10.1 | 59.0 |
| 3 | 13.1 | 6.4 |
| 4 | 14.3 | 7.6 |
| 5 | 16.4 | 9.5 |
| 6 | 17.7 | 100.0 |
| 7 | 18.0 | 39.0 |
| 8 | 20.2 | 9.5 |
| 9 | 21.7 | 24.0 |
| 10 | 22.1 | 11.3 |
| 11 | 24.1 | 31.4 |
| 12 | 24.8 | 46.6 |
| 13 | 26.0 | 8.6 |
| 14 | 26.6 | 17.8 |
| 15 | 30.6 | 18.5 | or, the crystal form has an X-ray powder diffraction (XRPD) pattern with characteristics represented by the XRPD pattern shown in FIG. 14.

10. The crystal form of the compound of formula (I), the pharmaceutically acceptable salt of the compound of formula (I) or the crystal form thereof according to claim 1, wherein, the hydrochloride salt is a salt formed with the compound of formula (I) and hydrochloric acid in a molar ratio of 1:1.

11. The crystal form of the compound of formula (I), the pharmaceutically acceptable salt of the compound of formula (I) or the crystal form thereof according to claim 1, wherein the crystal form of the compound of formula (I) or the crystal form of the pharmaceutically acceptable salt of the compound of formula (I) is presented as a crystalline composition comprising the crystal form of the compound of formula (I) or the crystal form of the pharmaceutically acceptable salt of the compound of formula (I), wherein the crystal form of the compound of formula (I) or the crystal form of the pharmaceutically acceptable salt of the compound of formula (I) accounts for 50% or more, or 80% or more, or 90% or more, or 95% or more of the weight of the crystalline composition.

12. A pharmaceutical composition comprising a therapeutically effective amount of an active ingredient, wherein the active ingredient the crystal form of the compound of formula (I), the pharmaceutically acceptable salt of the compound of formula (I) or the crystal form thereof according to claim 1.

13. A method for treating a disease mediated by BET protein in a mammal, comprising administering to the mammal in need thereof a therapeutically effective amount of the crystal form of the compound of formula (I), the pharmaceutically acceptable salt of the compound of formula (I) or the crystal form thereof according to claim 1.

14. The method according to claim 13, wherein the disease mediated by BET protein is selected from cancer; preferably, the cancer is selected from a group consisting of a solid tumor and a hematological tumor; more preferably, the solid tumor is selected from the group consisting of breast cancer and prostate cancer; and more preferably, the hematological tumor is selected from the group consisting of acute myelogenous leukemia, multiple myeloma, and diffuse large B-cell lymphoma.

15. A preparation method for the crystal form of the compound of formula (I), the pharmaceutically acceptable salt of the compound of formula (I) or the crystal form thereof according to claim 1, wherein the preparation method is a preparation method for the crystal form of the compound of formula (I) comprising the following steps:

(1) mixing the compound of formula (I) with a solvent I; and optionally mixing the mixture of the step (1) with a solvent II; and (2) performing filtering and drying processes;

wherein the solvent I and the solvent II are each selected from one of or a mixed solvent of one or more of water, acetonitrile, methanol, ethanol, isopropanol, ethyl acetate, acetone, dimethyl sulfoxide and dichloromethane, preferably selected from one of or a mixed solvent of one or more of water, acetonitrile, methanol, dimethyl sulfoxide and dichloromethane, more preferably selected from water and dimethyl sulfoxide, and further preferably a mixed solvent of dichloromethane and methanol; or the preparation method is a preparation method for the crystal form of the compound of formula (I) comprising the following steps:

(1) mixing a hydrochloride salt of the compound of formula (I) with a solvent III; and optionally mixing the mixture of the step (1) with a solvent IV; and (2) performing filtering and drying processes;

wherein the solvent III and the solvent IV are each independently selected from the group consisting of water, acetonitrile, methanol, ethanol, isopropanol, ethyl acetate and acetone; and the hydrochloride salt of the compound of formula (I) is selected from the group consisting of the crystal forms of a hydrochloride salt of the compound of formula (I) according to claim 1; or the preparation method is a preparation method for the crystal form of the pharmaceutically acceptable salt of the compound of formula (I) comprising the following steps:

(1) mixing the compound of formula (I) with a solvent A;

(2) adding hydrochloric acid, sulfuric acid, phosphoric acid or methanesulfonic acid to the mixture of the step (1); and (3) performing filtering and drying processes;

wherein the solvent A is selected from one of or a mixed solvent of one or more of a mixed solvent of methanol, ethanol, isopropanol, acetone, ethyl acetate and acetonitrile;

the crystal form is selected from the group consisting of a crystal form of a hydrochloride salt of the compound of formula (I) having characteristic diffraction peaks at the following 2θ: 6.8°±0.2°, 8.4°±0.2°, 9.4°±0.2°, 10.2°±0.2°, and 16.8°±0.2° in an X-ray powder diffraction pattern, a crystal form of a sulfate salt of the compound of formula (I) according to claim 1, a crystal form of a phosphate salt of the compound of formula (I) according to claim 1, or a crystal form of a mesylate salt of the compound of formula (I) according to claim 1.

16. The crystal form of the compound of formula (I), the pharmaceutically acceptable salt of the compound of formula (I) or the crystal form thereof according to claim 1, wherein the sulfate salt is shown in formula II, and x is selected from 0.5-1,

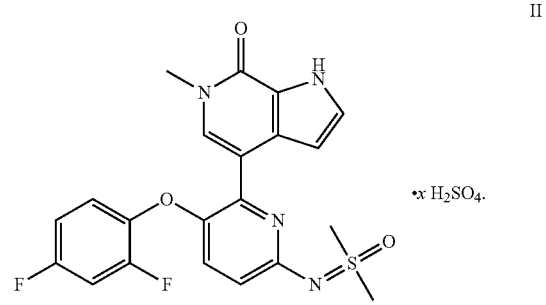 [SMILES: Cn1cc(-c2nc(N=S(C)(C)=O)ccc2Oc2ccc(F)cc2F)c2cc[nH]c2c1=O]

17. The crystal form of the compound of formula (I), the pharmaceutically acceptable salt of the compound of formula (I) or the crystal form thereof according to claim 1, wherein the phosphate salt is shown in formula III, and x is selected from 0.5-1,

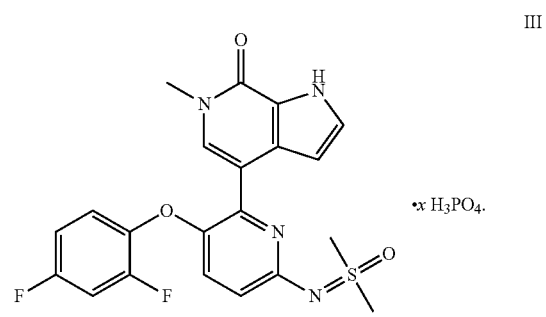 [SMILES: Cn1cc(-c2nc(N=S(C)(C)=O)ccc2Oc2ccc(F)cc2F)c2cc[nH]c2c1=O]

18. The crystal form of the compound of formula (I), the pharmaceutically acceptable salt of the compound of formula (I) or the crystal form thereof according to claim 1, wherein the mesylate salt is shown in formula IV, and x is selected from 0.5-1,

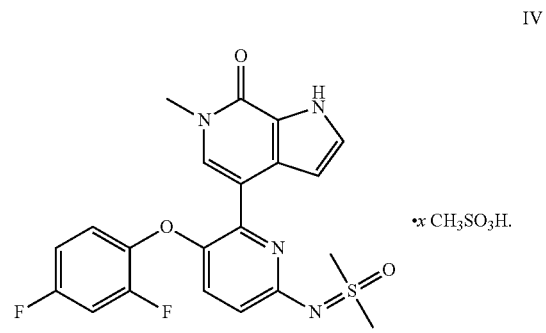 [SMILES: Cn1cc(-c2nc(N=S(C)(C)=O)ccc2Oc2ccc(F)cc2F)c2cc[nH]c2c1=O]

19. The method according to claim 14, wherein the solid tumor is selected from the group consisting of breast cancer and prostate cancer.

20. The method according to claim 14, the hematological tumor is selected from the group consisting of acute myelogenous leukemia, multiple myeloma, and diffuse large B-cell lymphoma.

* * * * *